United States Patent [19]

Griesshaber

[11] Patent Number: 5,239,582
[45] Date of Patent: Aug. 24, 1993

[54] RAMP GENERATION FOR PREVENTING TRANSITIONS WITH INFINITE SHORT RISE TIME IN A VIDEO SCRAMBLING SYSTEM

[75] Inventor: K. Heinz Griesshaber, Los Gatos, Calif.

[73] Assignee: Macrovision Corporation, Mountain View, Calif.

[21] Appl. No.: 790,733

[22] Filed: Nov. 8, 1991

[51] Int. Cl.$^5$ .............................................. H04N 7/167
[52] U.S. Cl. ........................................ 380/14; 380/17; 380/10
[58] Field of Search .......................... 380/14, 10, 9, 17

[56] References Cited

U.S. PATENT DOCUMENTS

| | | |
|---|---|---|
| 4,563,702 | 1/1986 | Heller et al. ............................ 380/14 |
| 4,723,282 | 2/1988 | Marie et al. . |
| 4,757,531 | 7/1988 | Lodge et al. . |
| 4,796,299 | 1/1989 | Hamilton . |
| 4,827,510 | 5/1989 | Walker et al. ............................ 380/14 |
| 4,945,564 | 7/1990 | Christian et al. . |
| 4,964,162 | 10/1990 | McAdam et al. . |
| 5,014,310 | 5/1991 | Walker et al. . |
| 5,046,091 | 9/1991 | Marie et al. ............................ 380/14 |

*Primary Examiner*—David Cain
*Attorney, Agent, or Firm*—Skjerven, Morrill, MacPherson, Franklin & Friel

[57] ABSTRACT

A method and apparatus for generating a ramp at cutpoints in a cut and rotate video line scrambling system. The undesirable shortening of the active portion of the video line which typically occurs in cut and rotate scrambling to overcome the problem of abrupt transitions at the cutpoints is eliminated by providing a synthesized ramp between the video amplitude level at the cutpoint and the blanking level at each of the cutpoints. This synthesized ramp is calculated by digital logic in conjunction with a delay line for inserting the ramp at its proper temporal position in the video signal. The ramp approximates a sine$^2$ function and is formed of three consecutive pixels, each pixel having an associated calculated video amplitude.

15 Claims, 43 Drawing Sheets

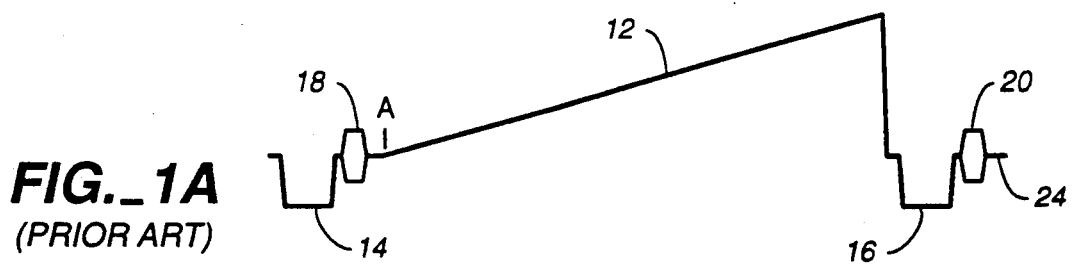
FIG._1A
(PRIOR ART)
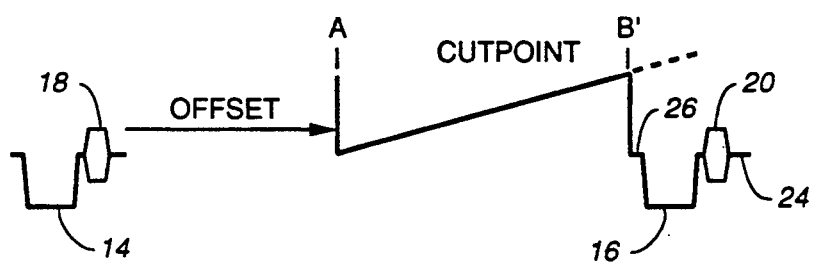
FIG._1B
(PRIOR ART)
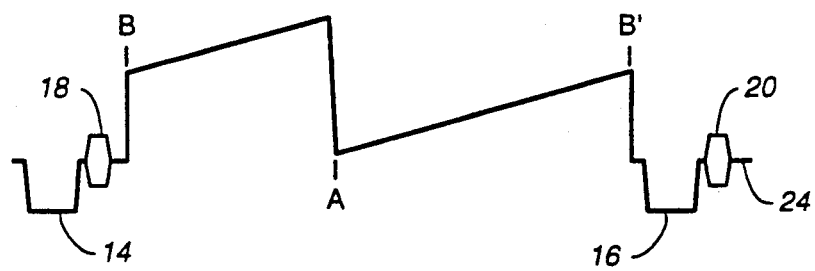
FIG._1C
(PRIOR ART)
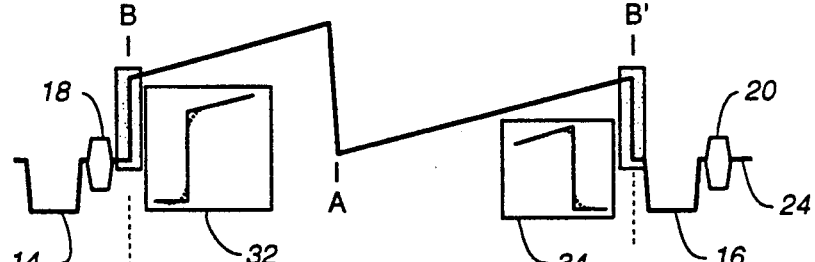
FIG._1D
(PRIOR ART)
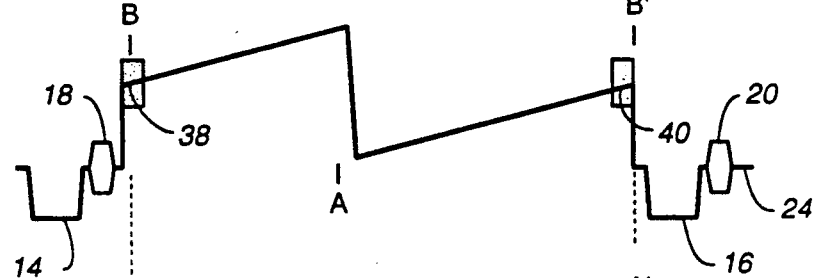
FIG._1E
(PRIOR ART)
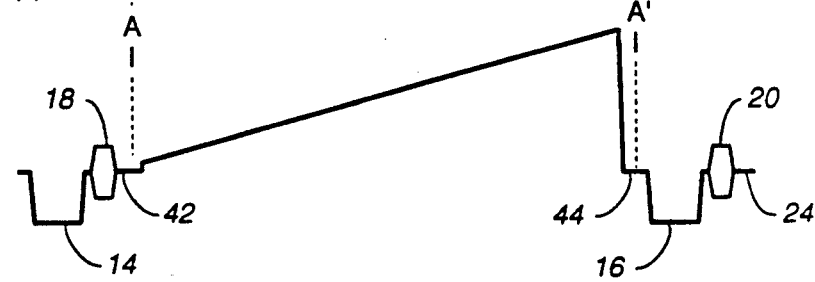
FIG._1F
(PRIOR ART)

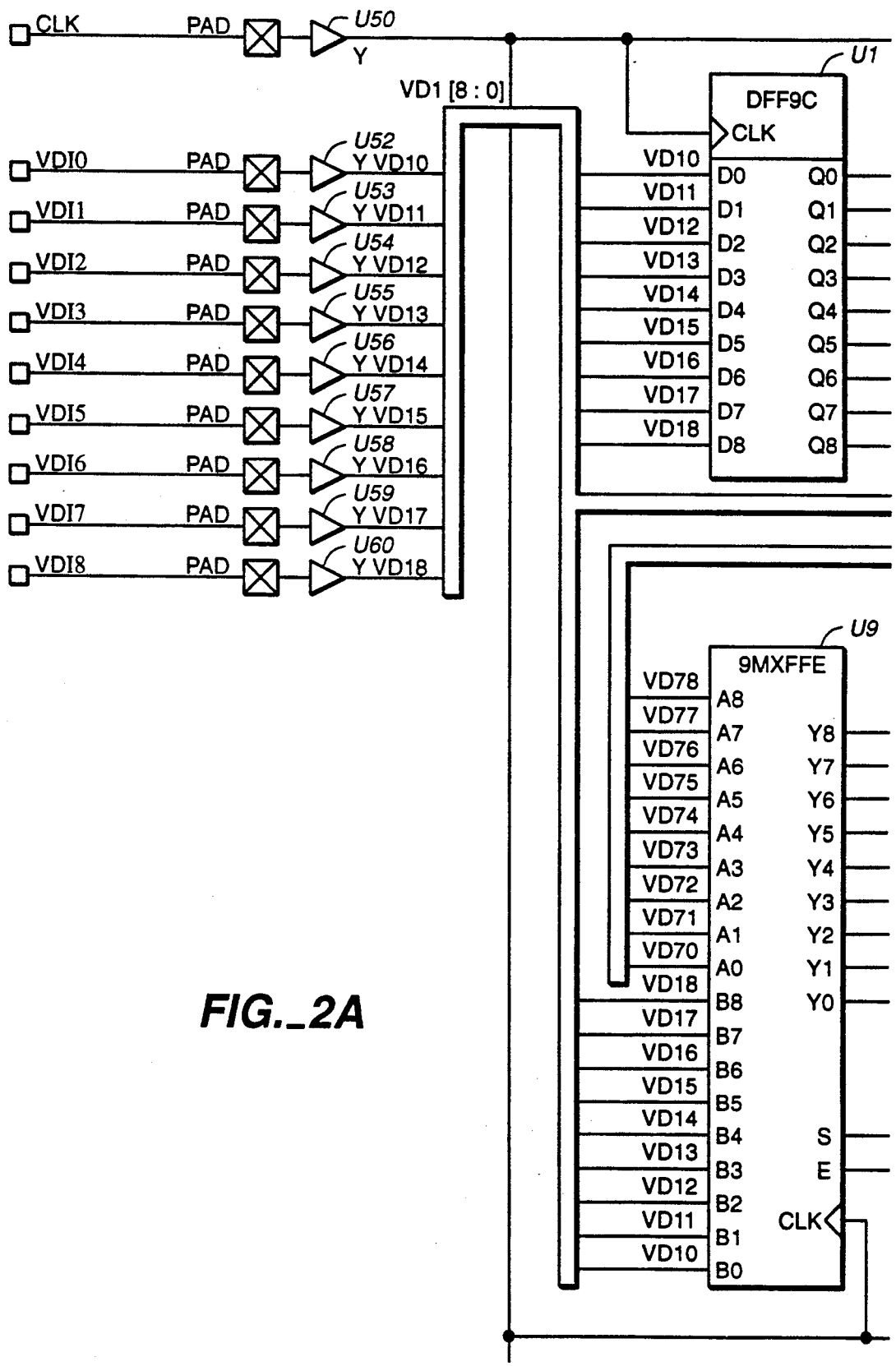
FIG._2A

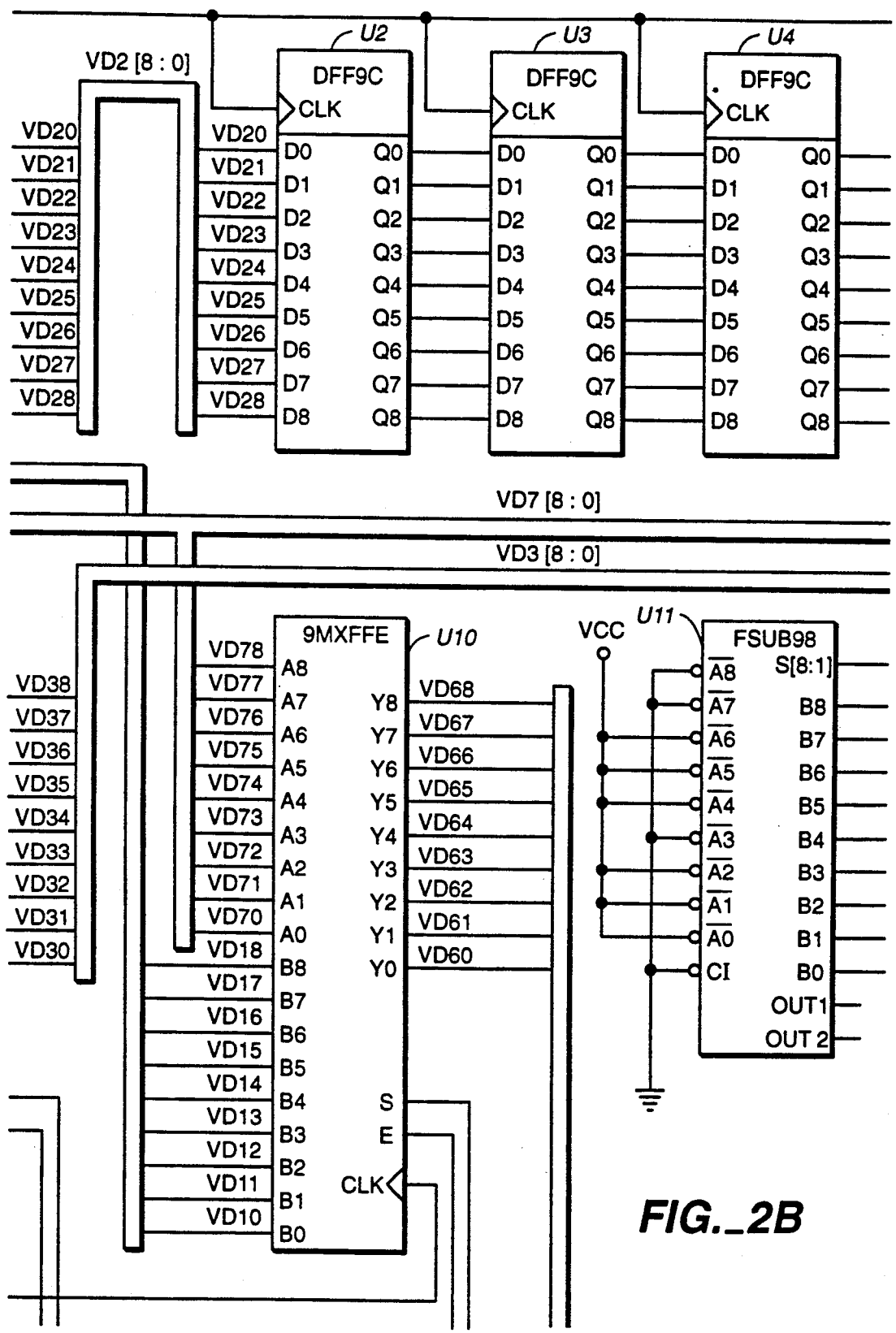
FIG._2B

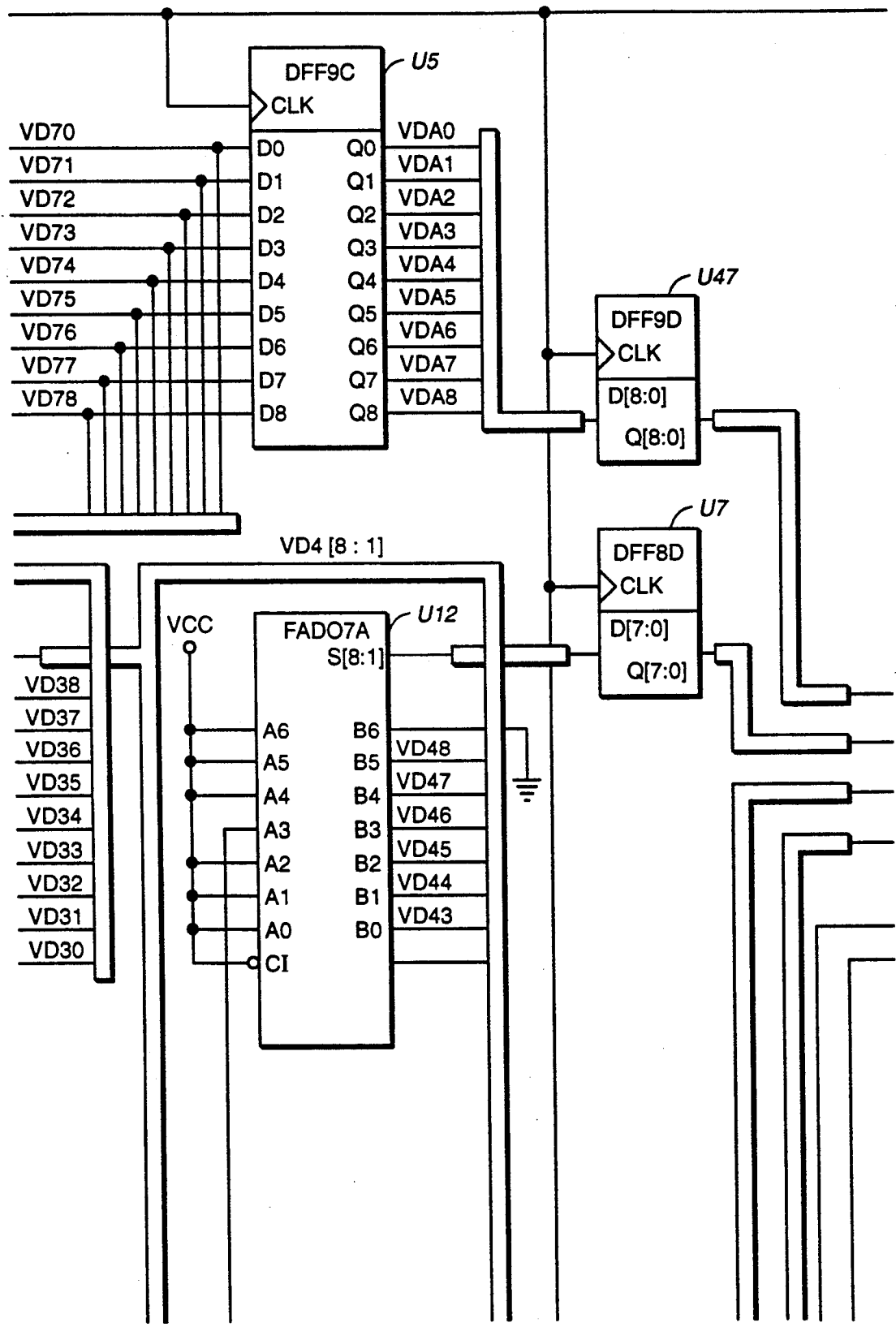
FIG._2C

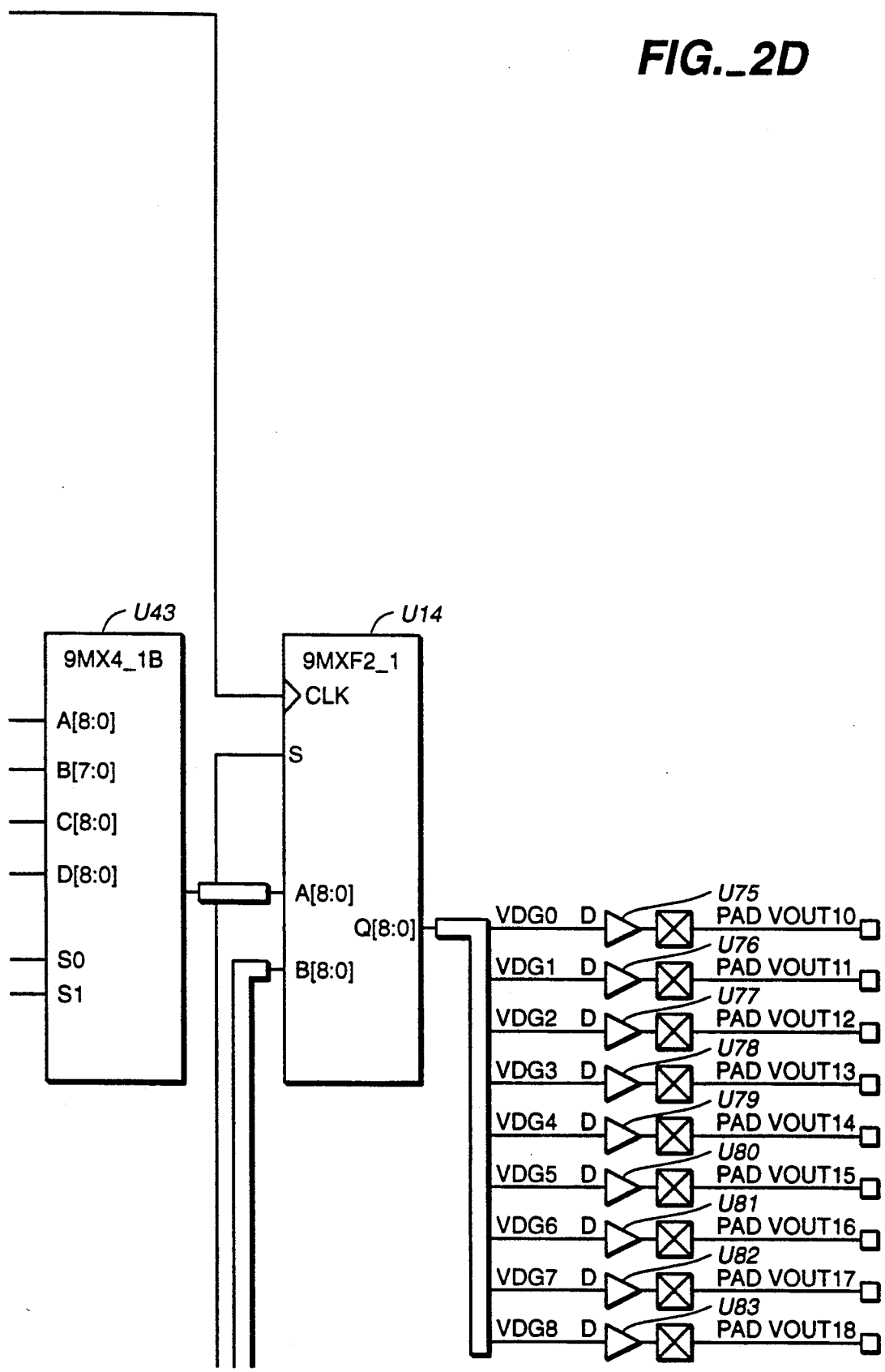
FIG._2D

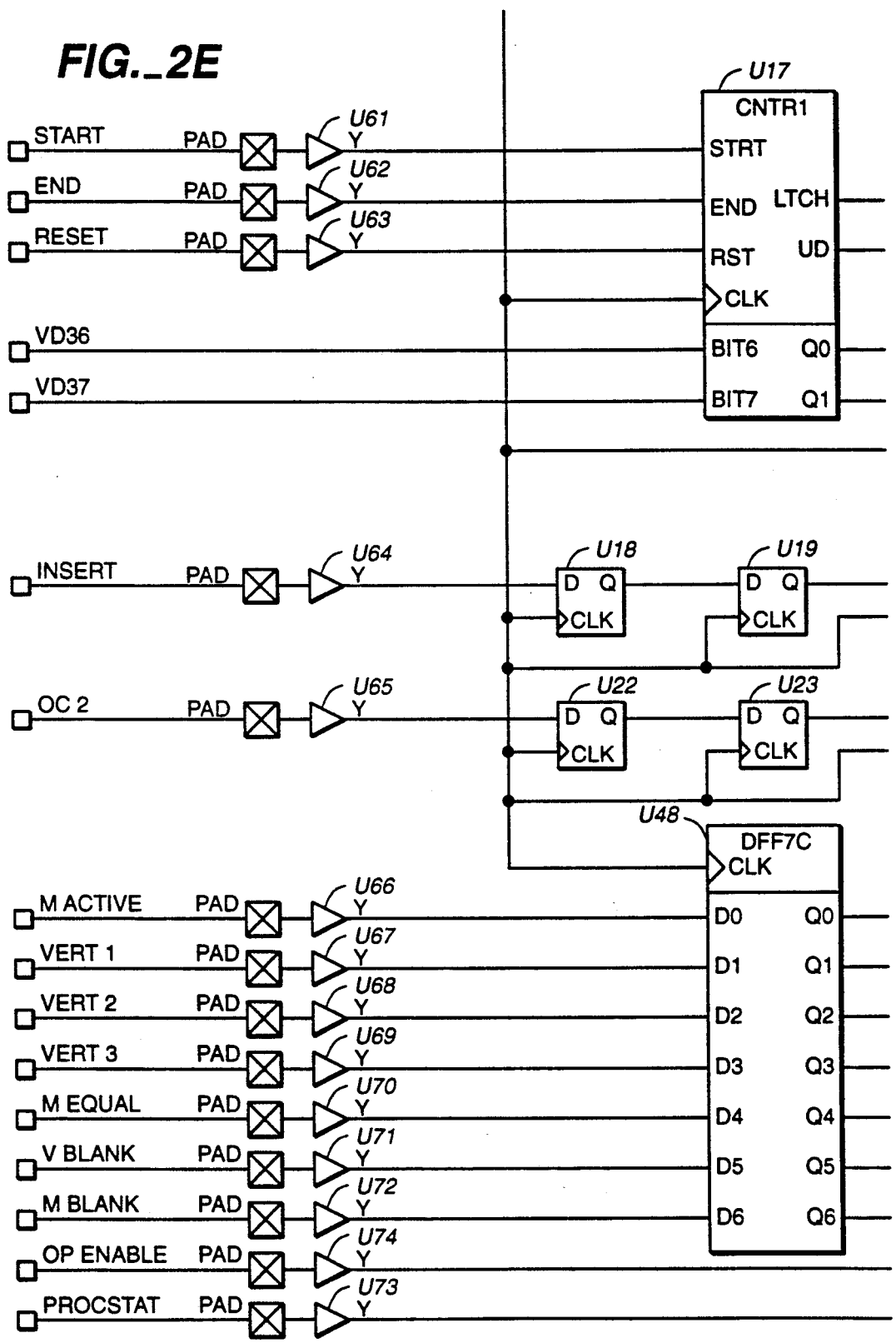
FIG._2E

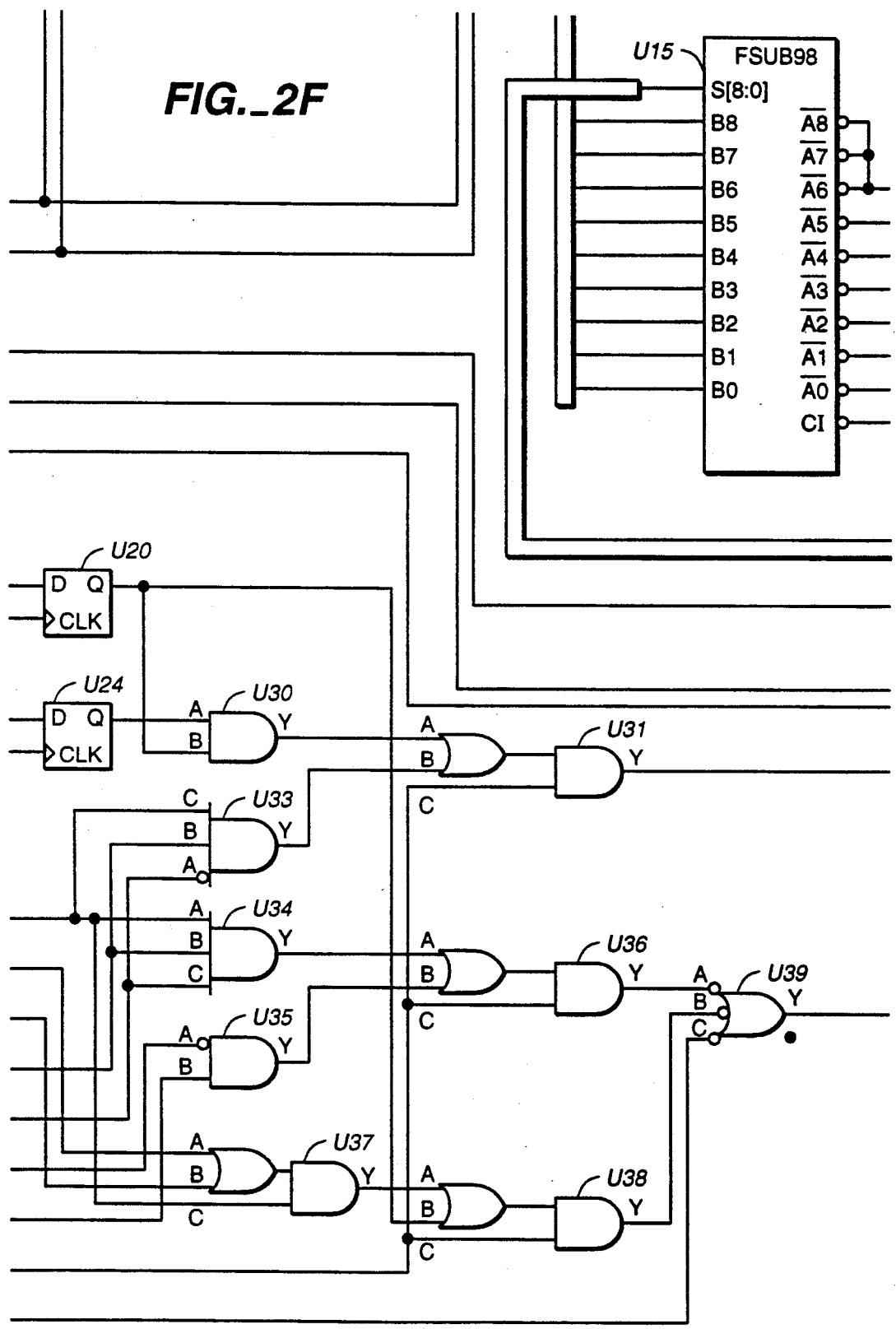
FIG._2F

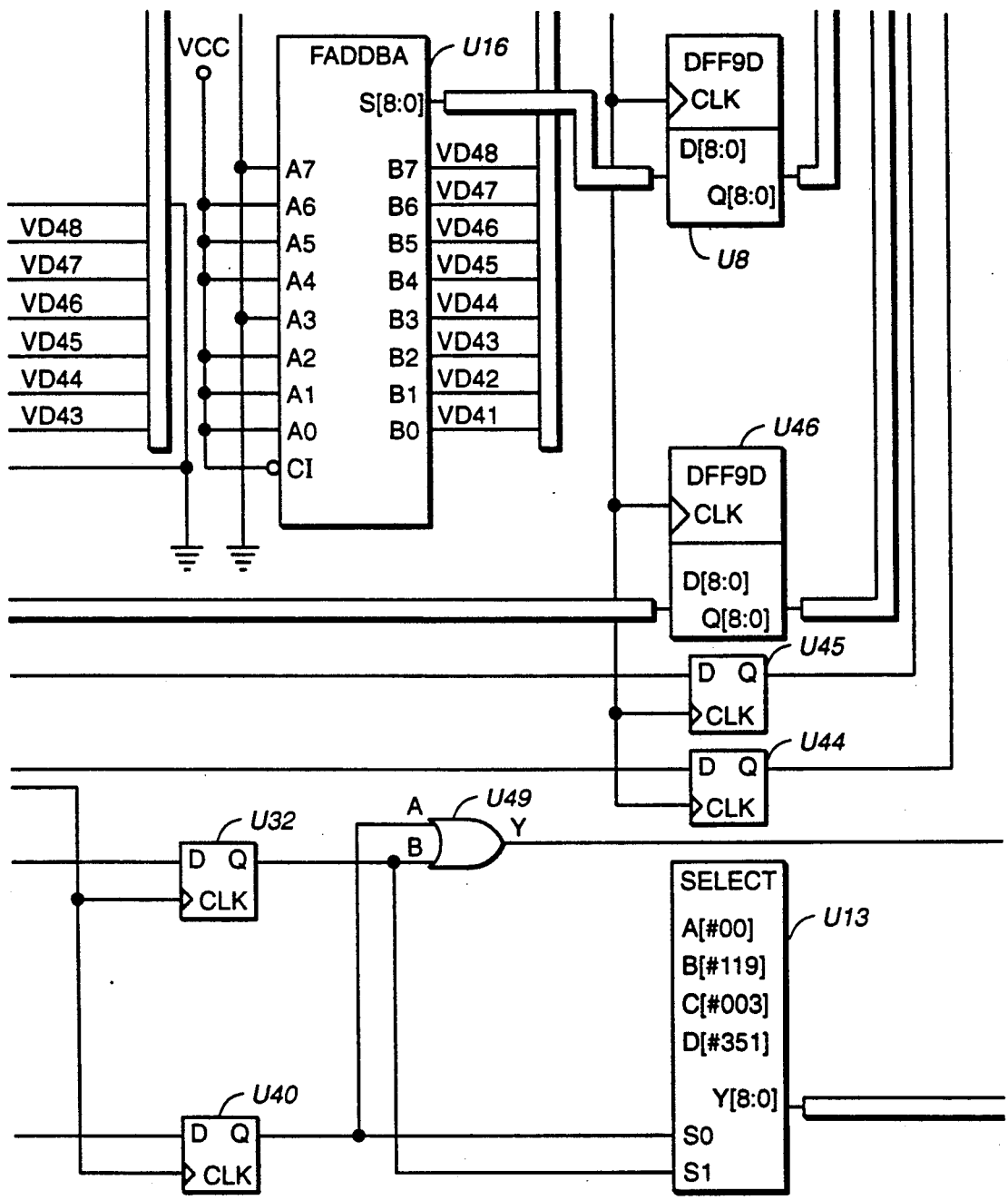
FIG._2G

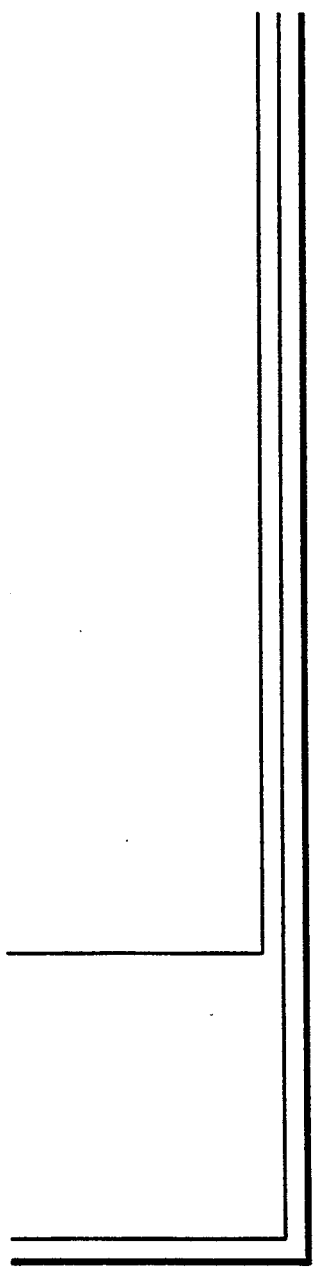
FIG._2H
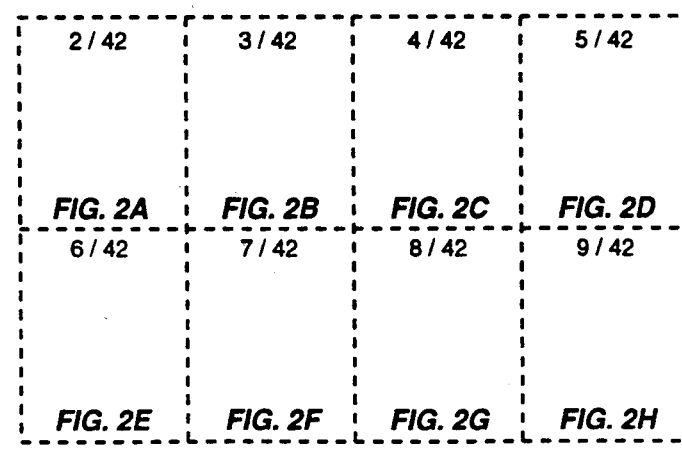
FIG._2

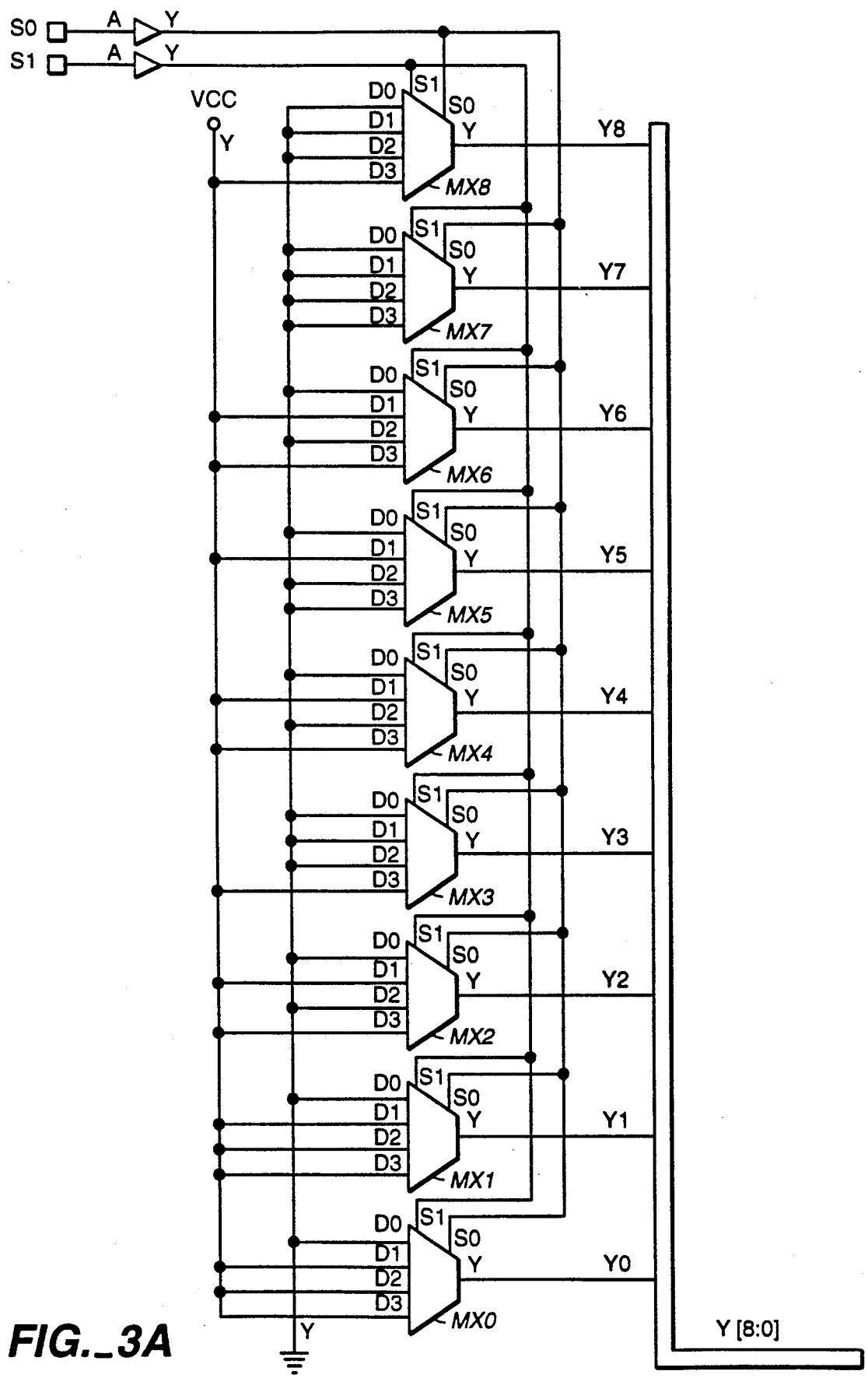
FIG._3A

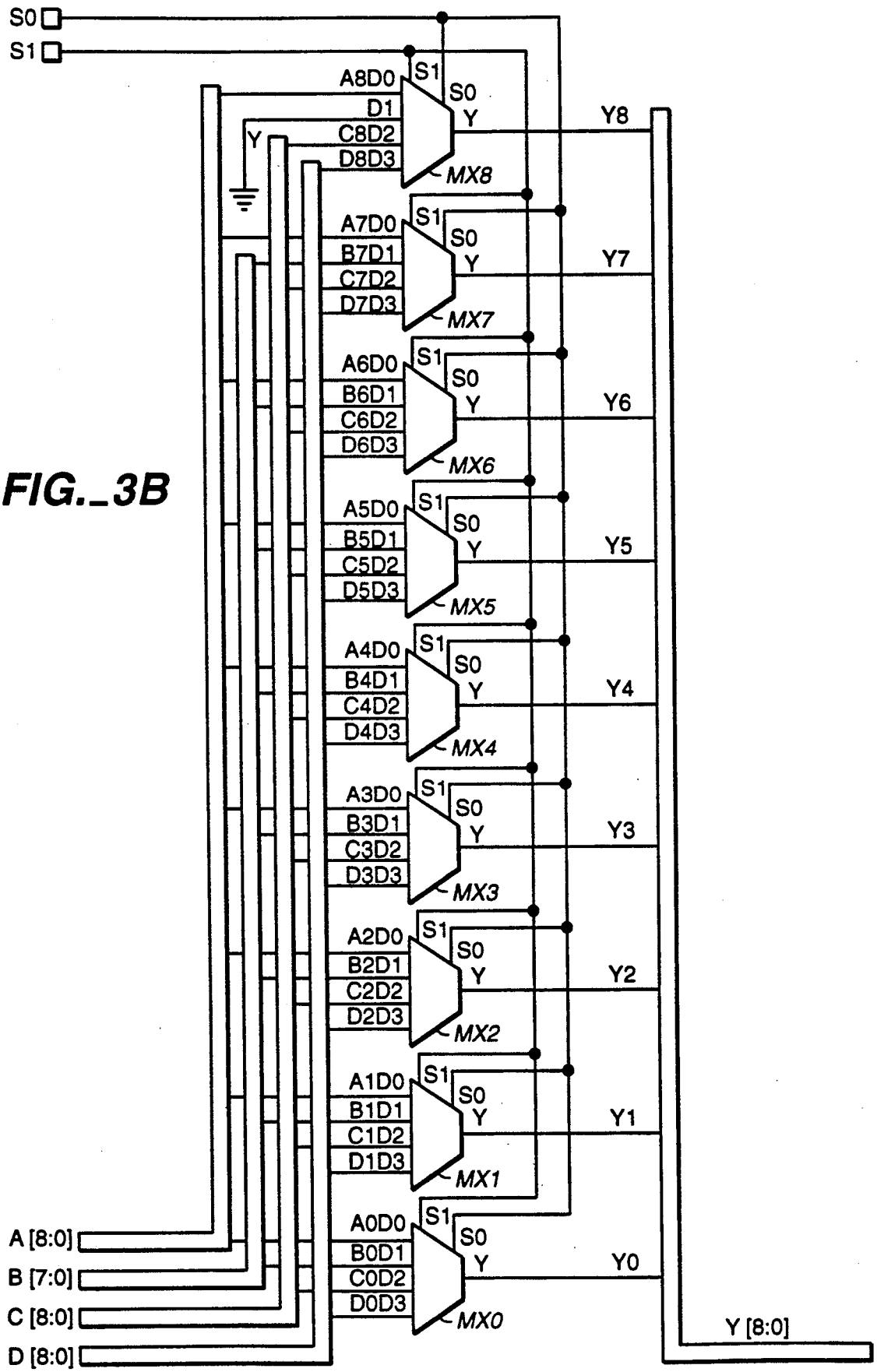
FIG._3B

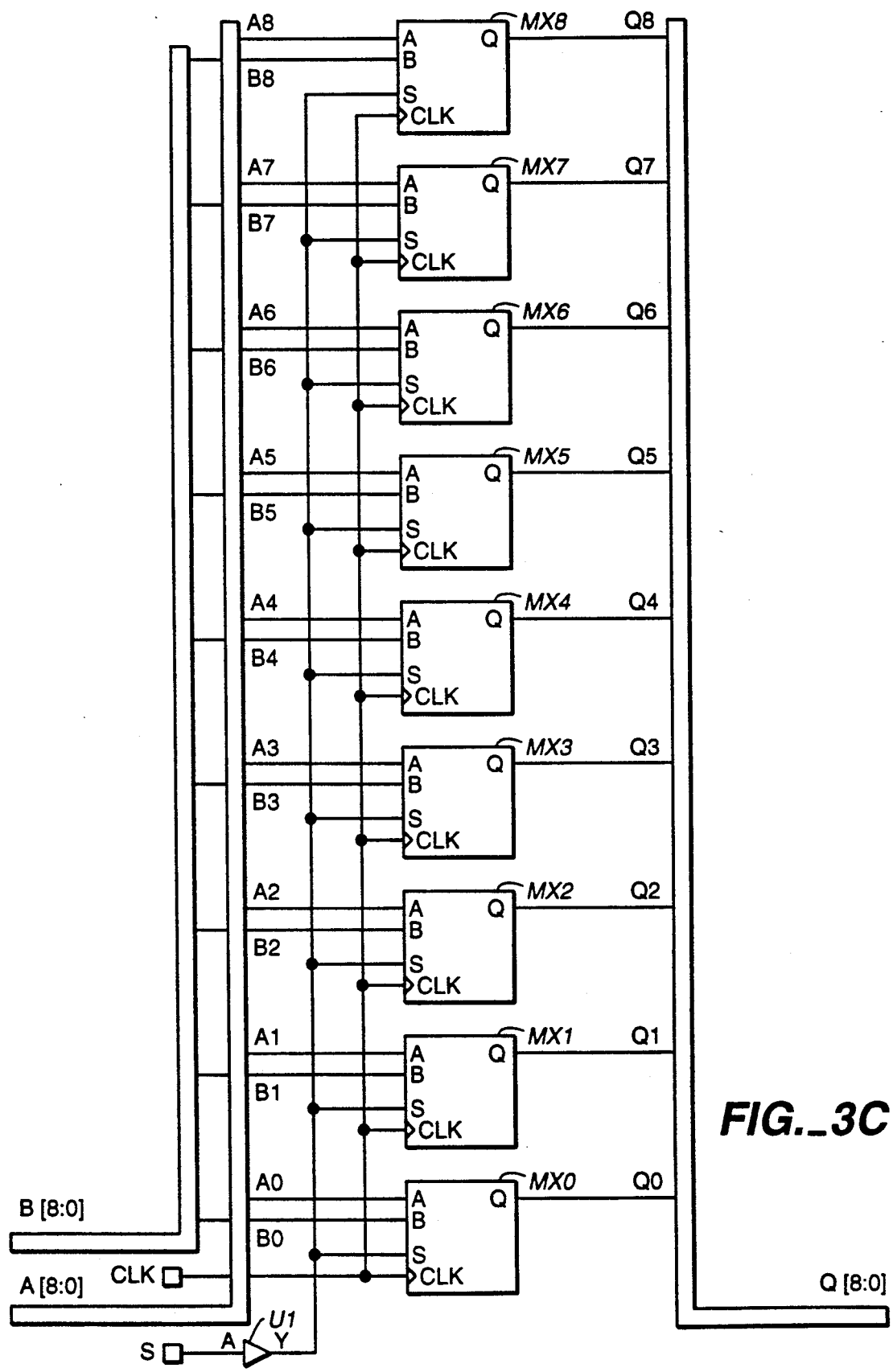
FIG._3C

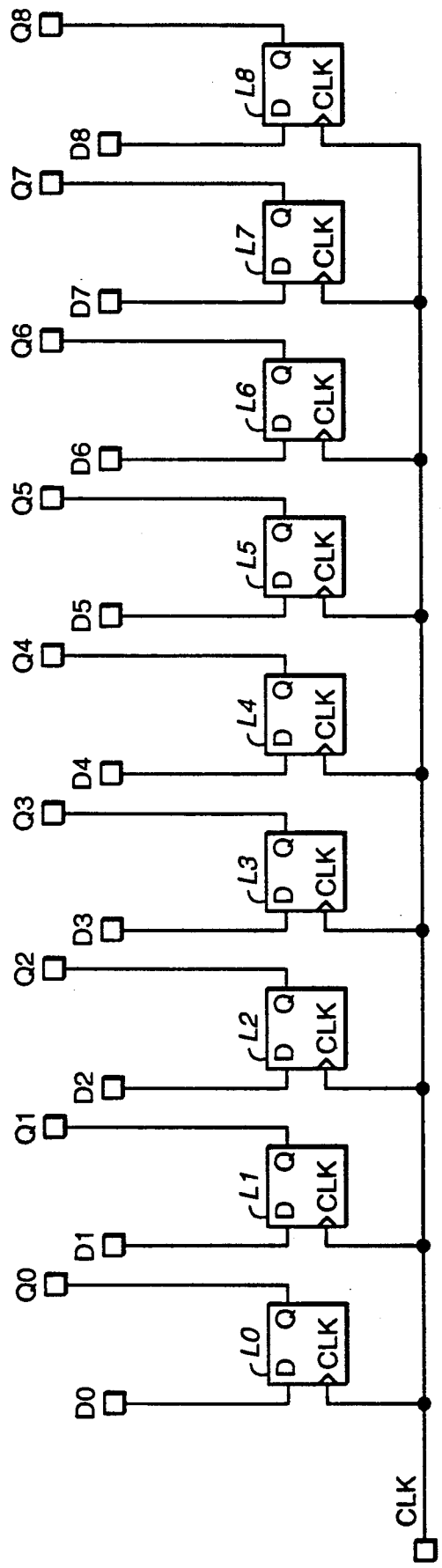
FIG._4A

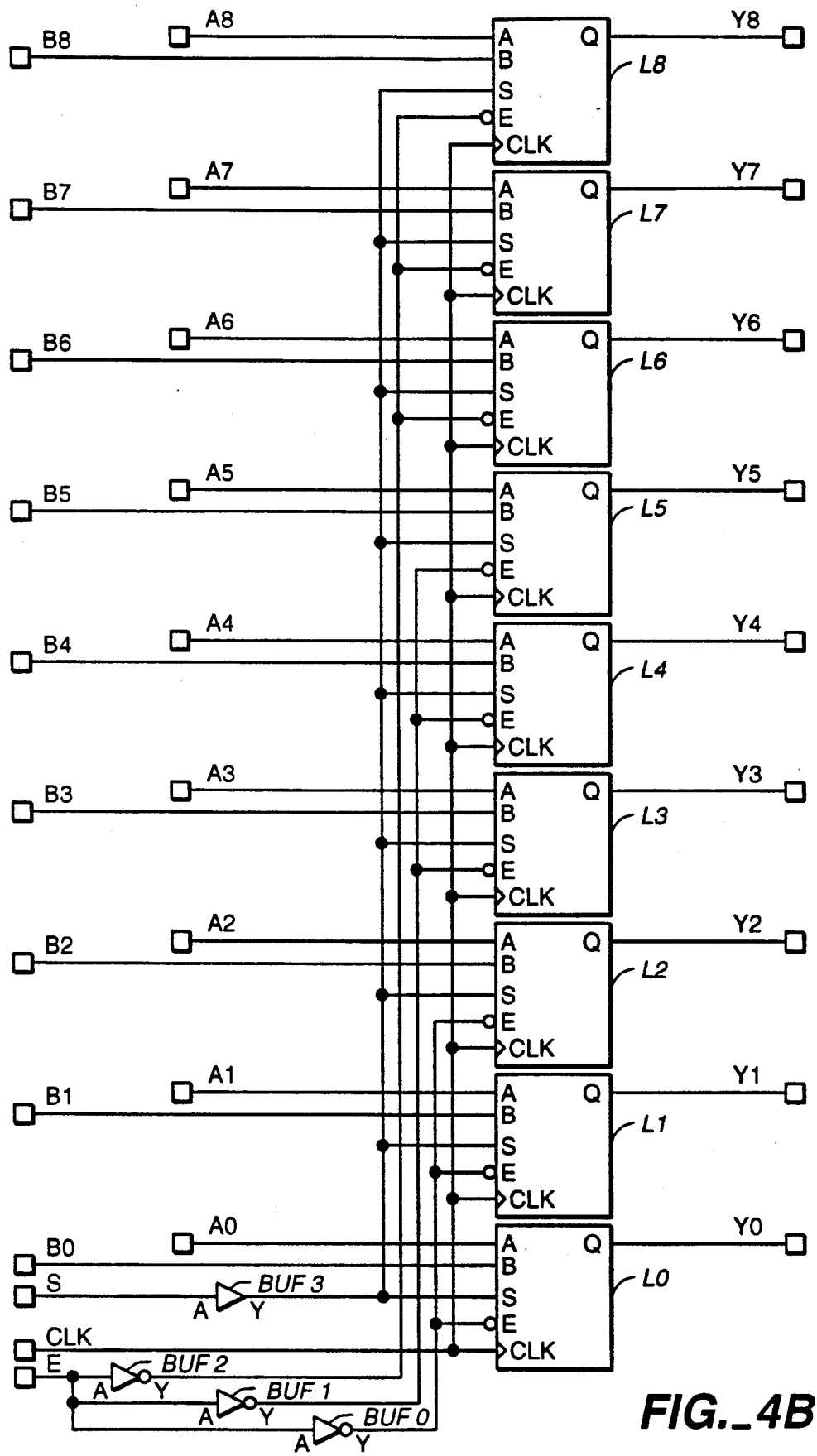
FIG._4B

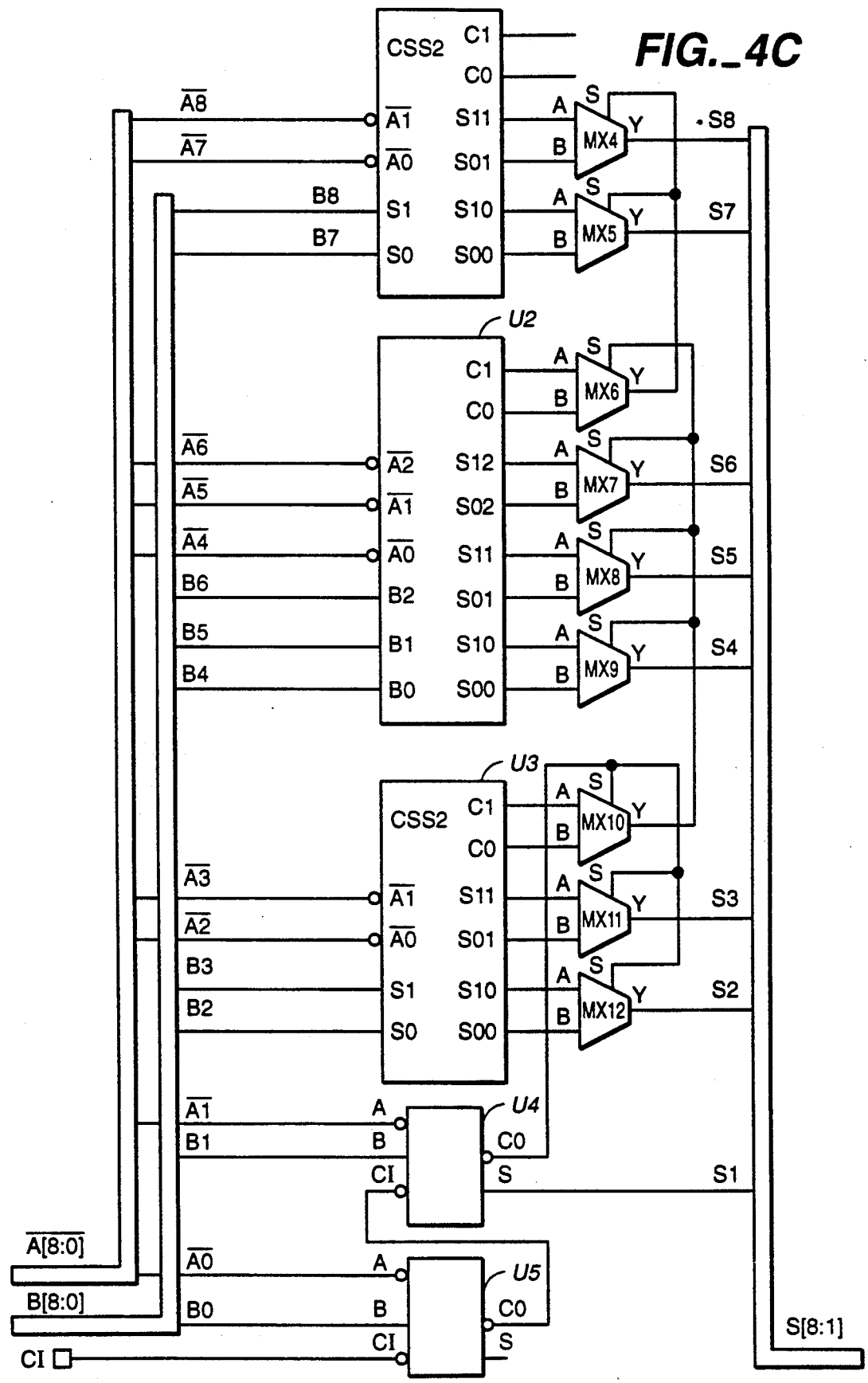
FIG._4C

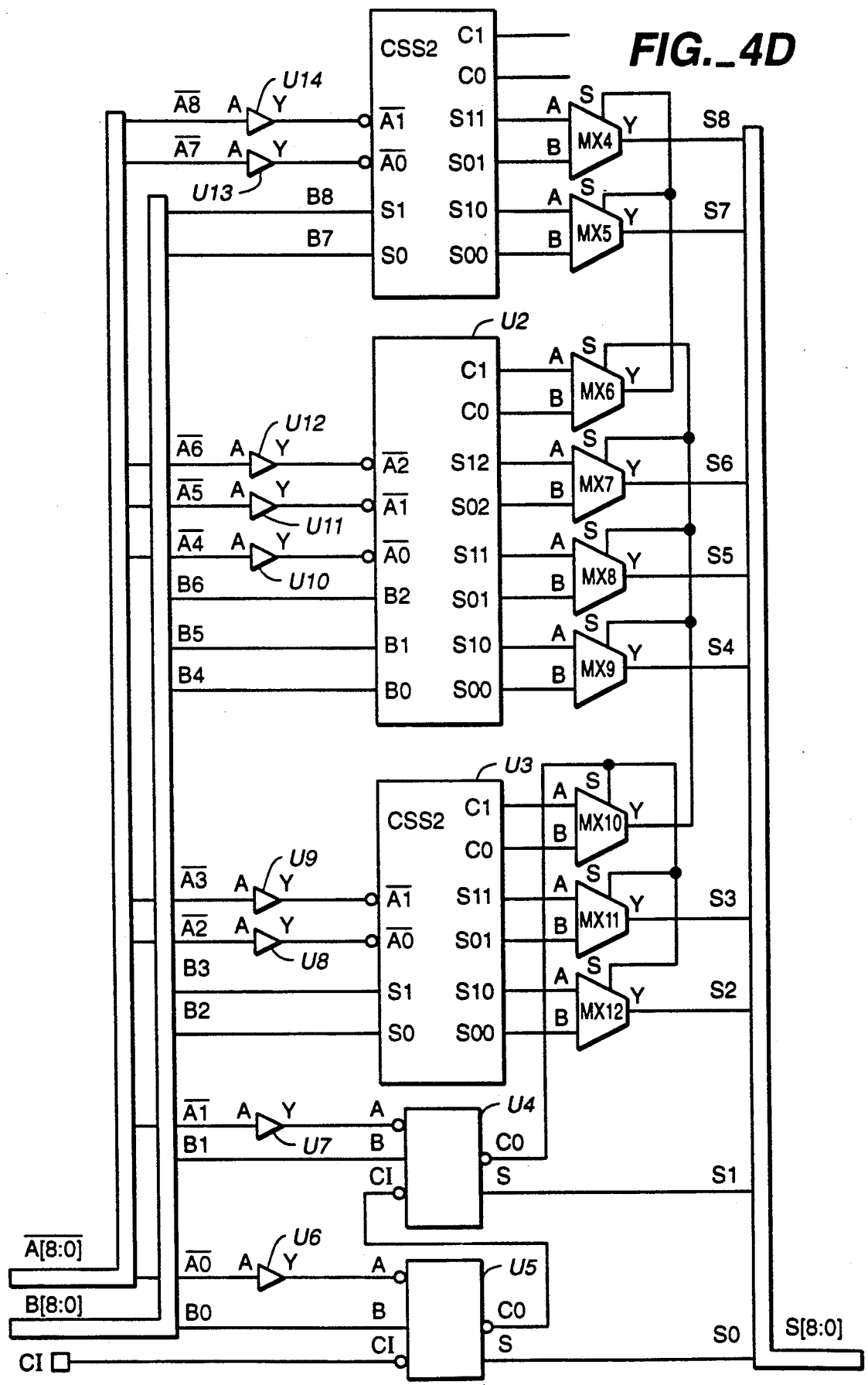
FIG._4D

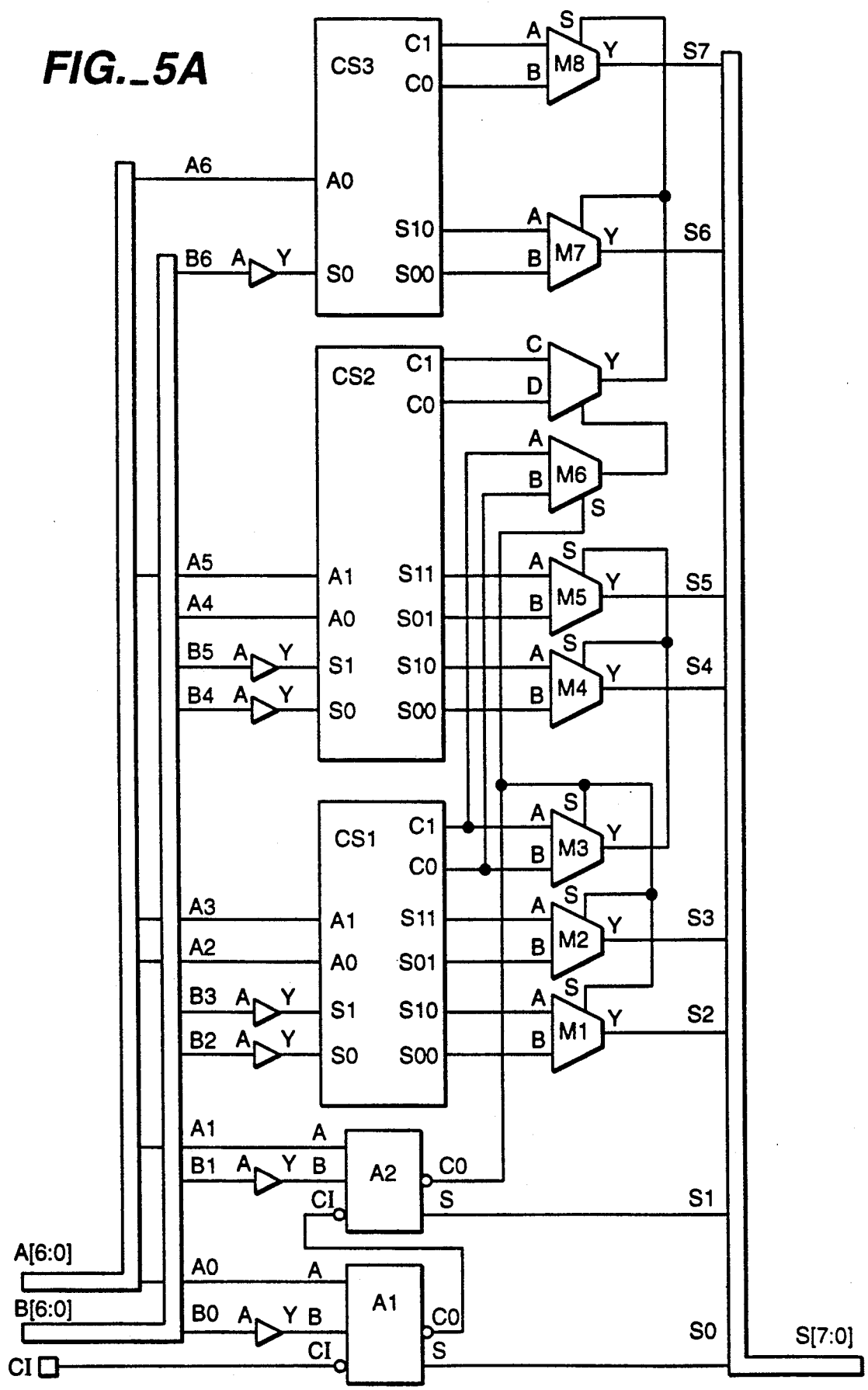
FIG._5A

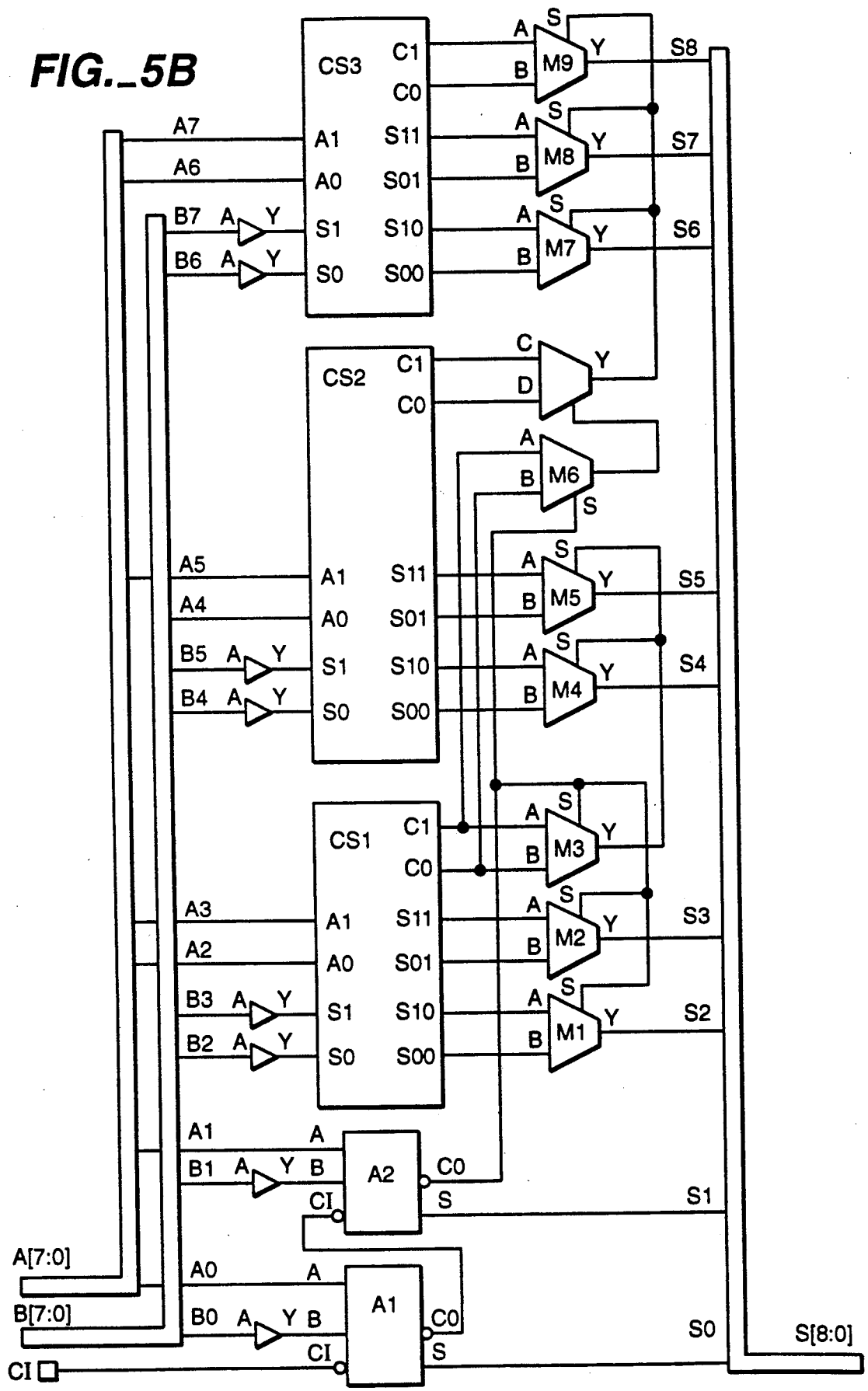
FIG._5B

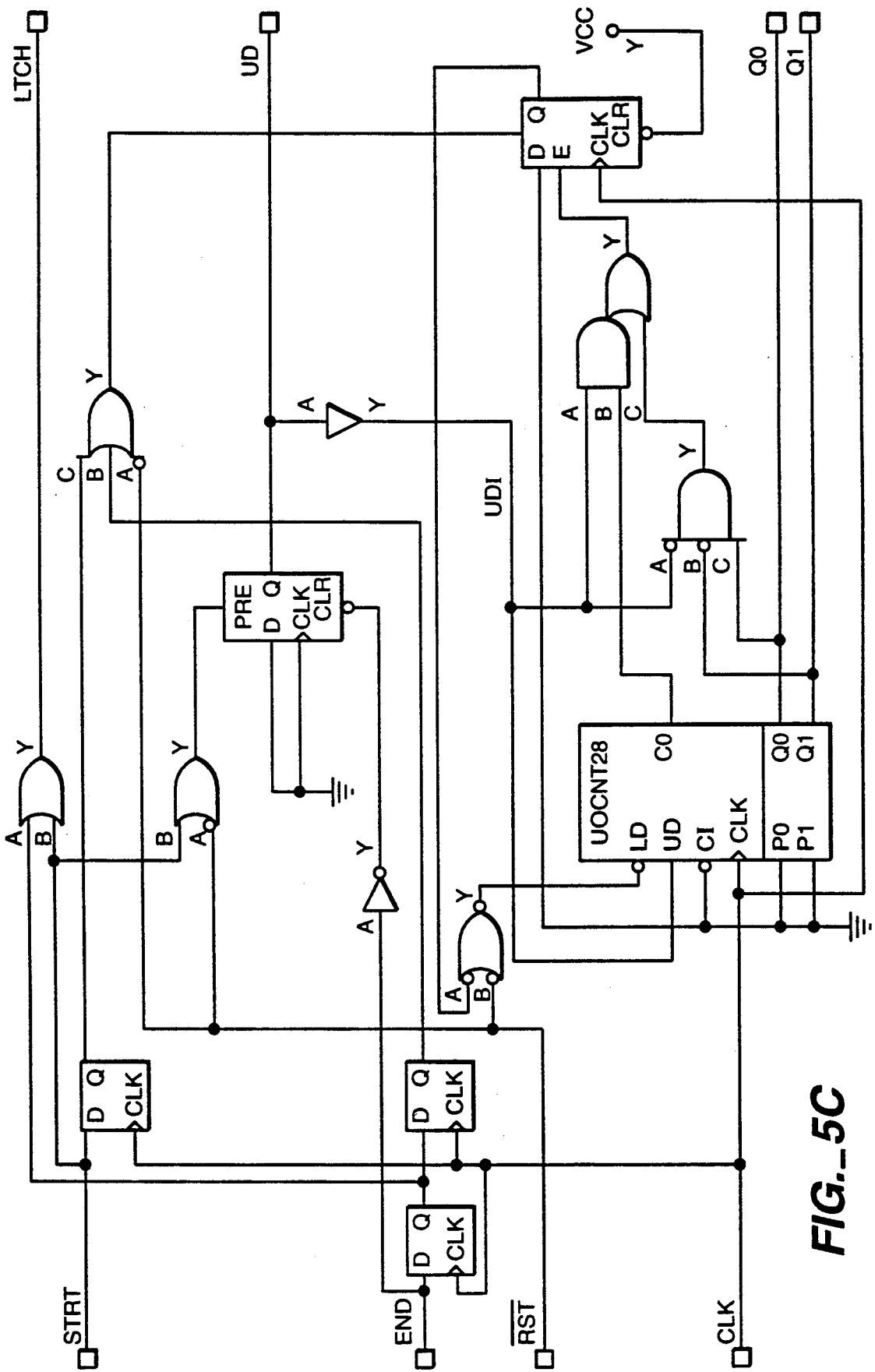
FIG._5C

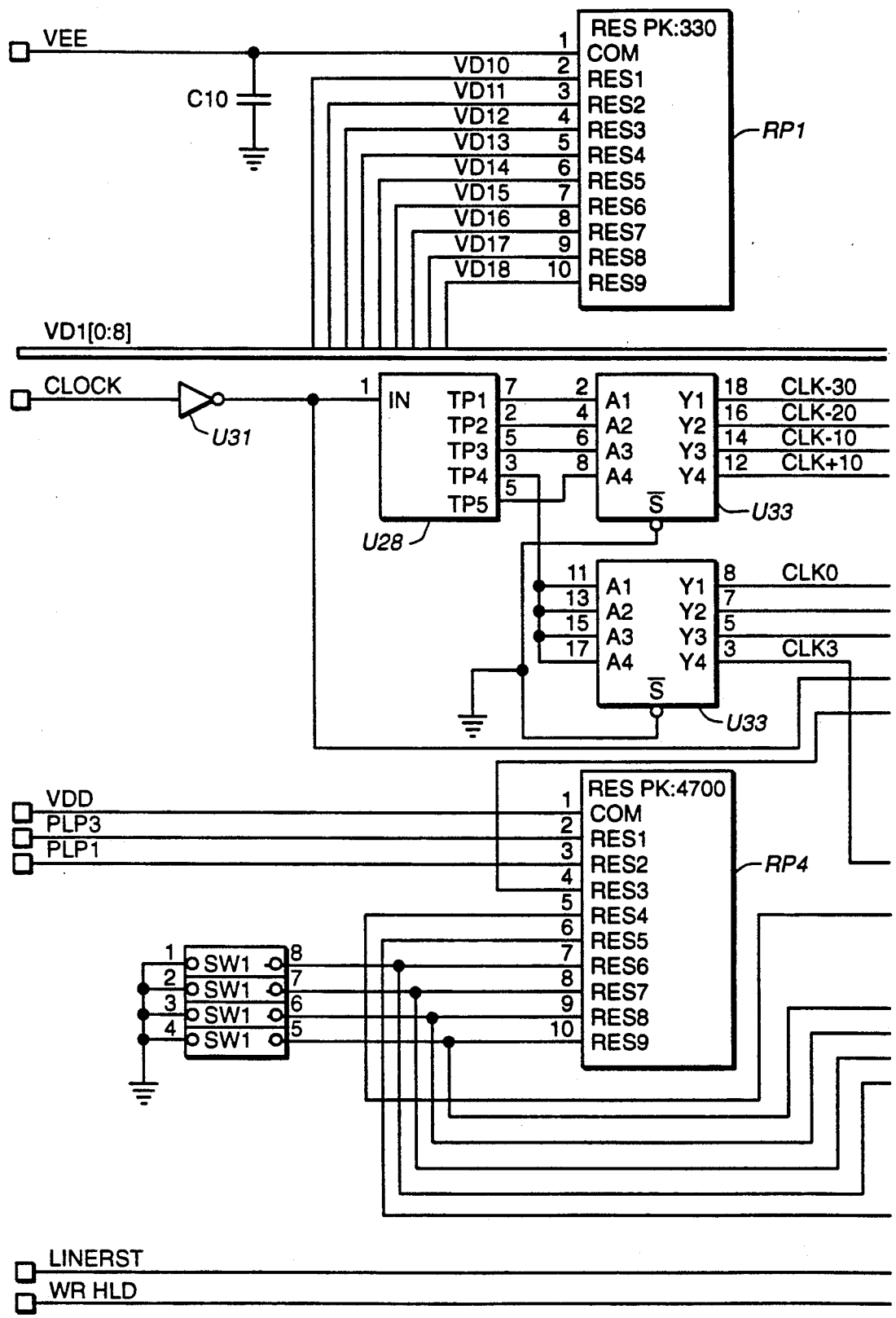
FIG._6A-1

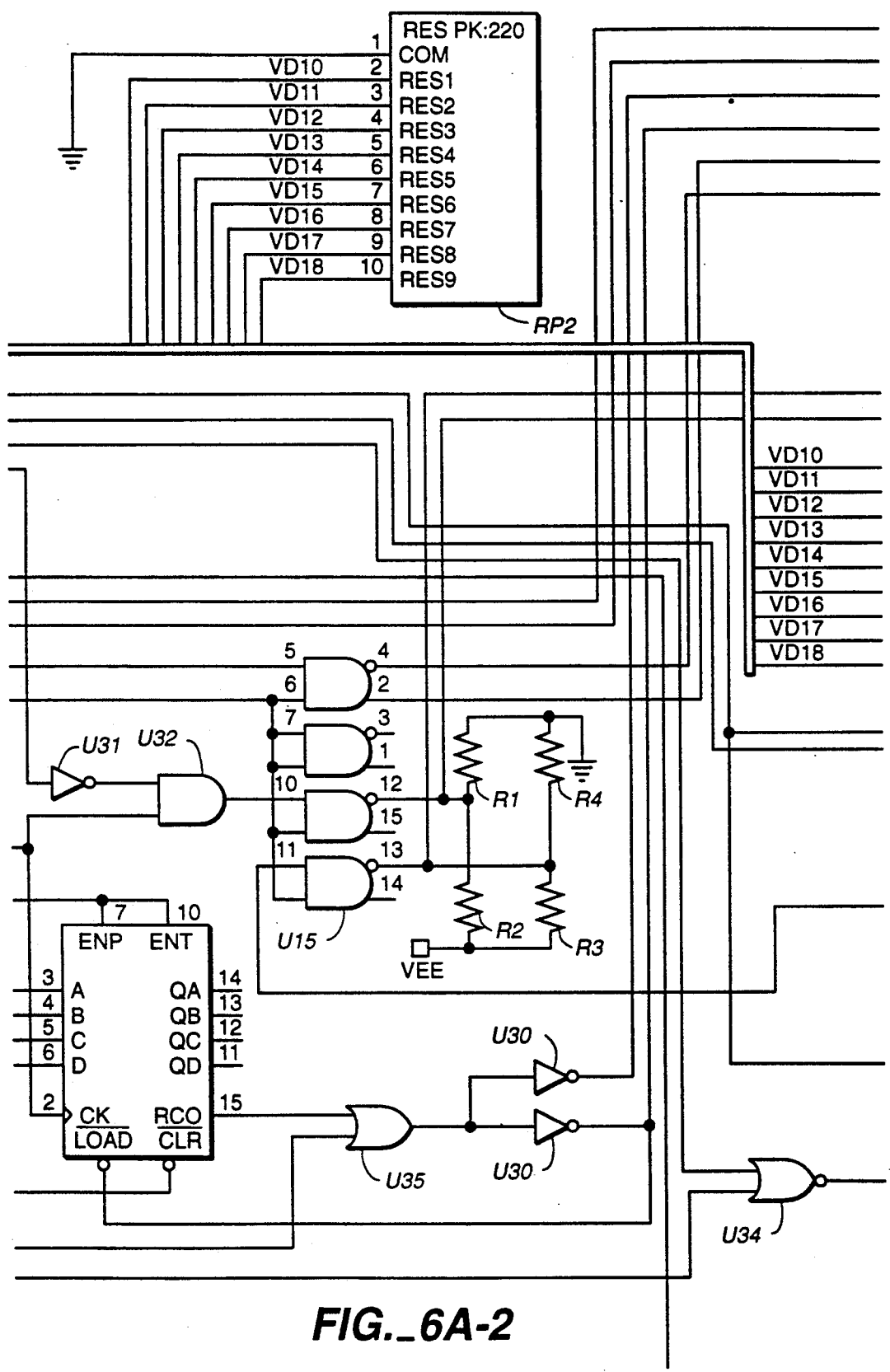
FIG._6A-2

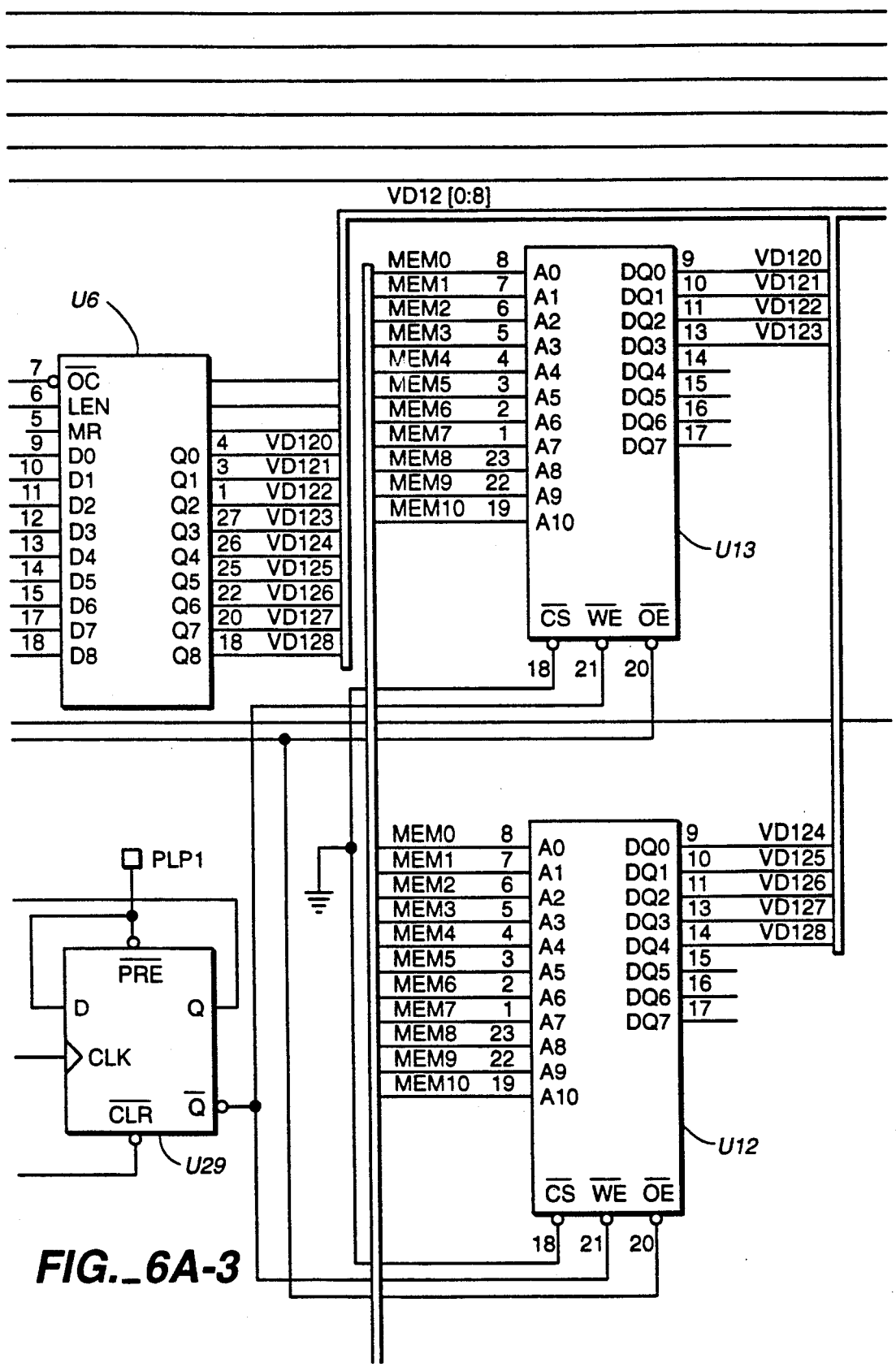
FIG._6A-3

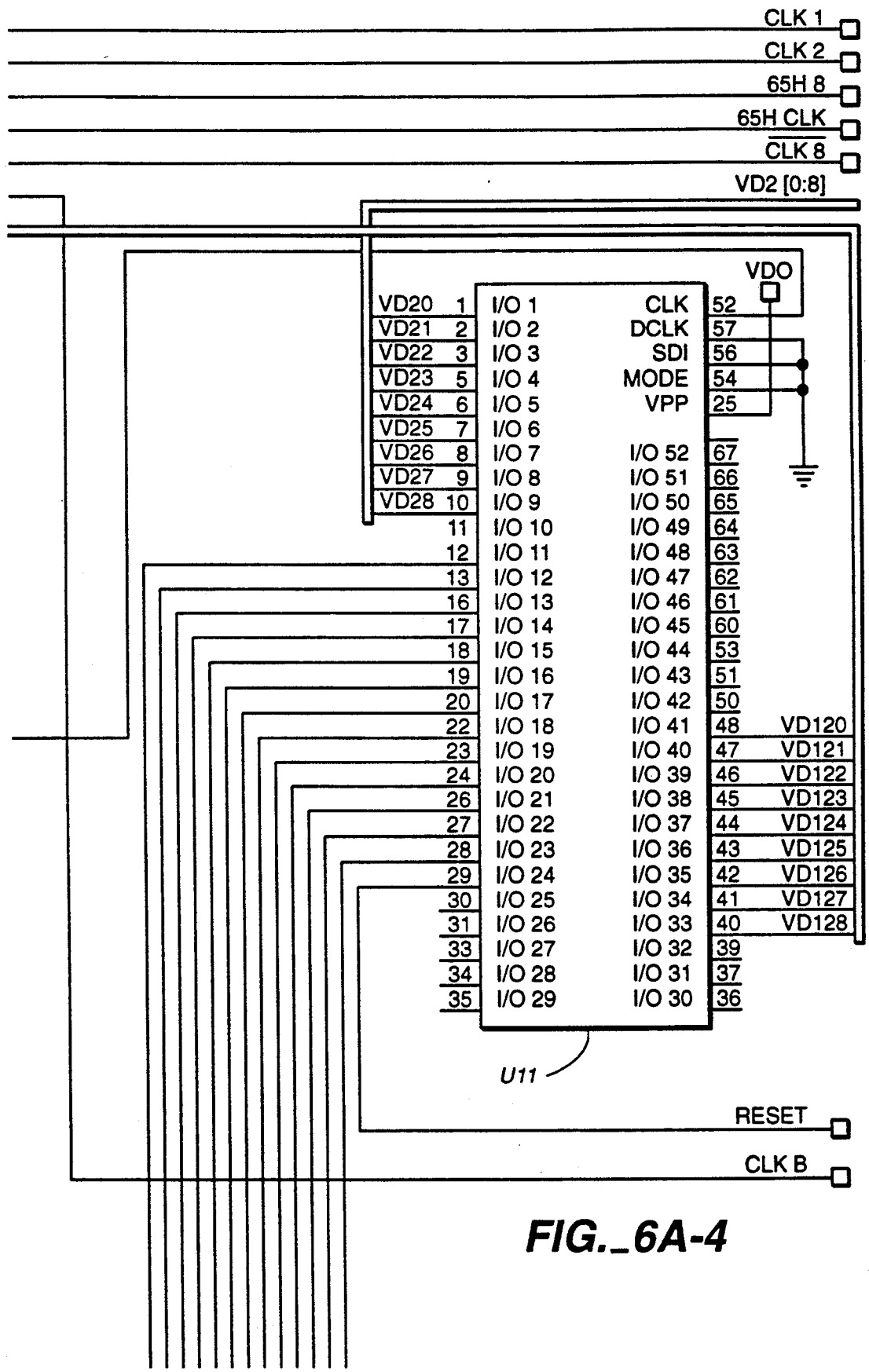
FIG._6A-4

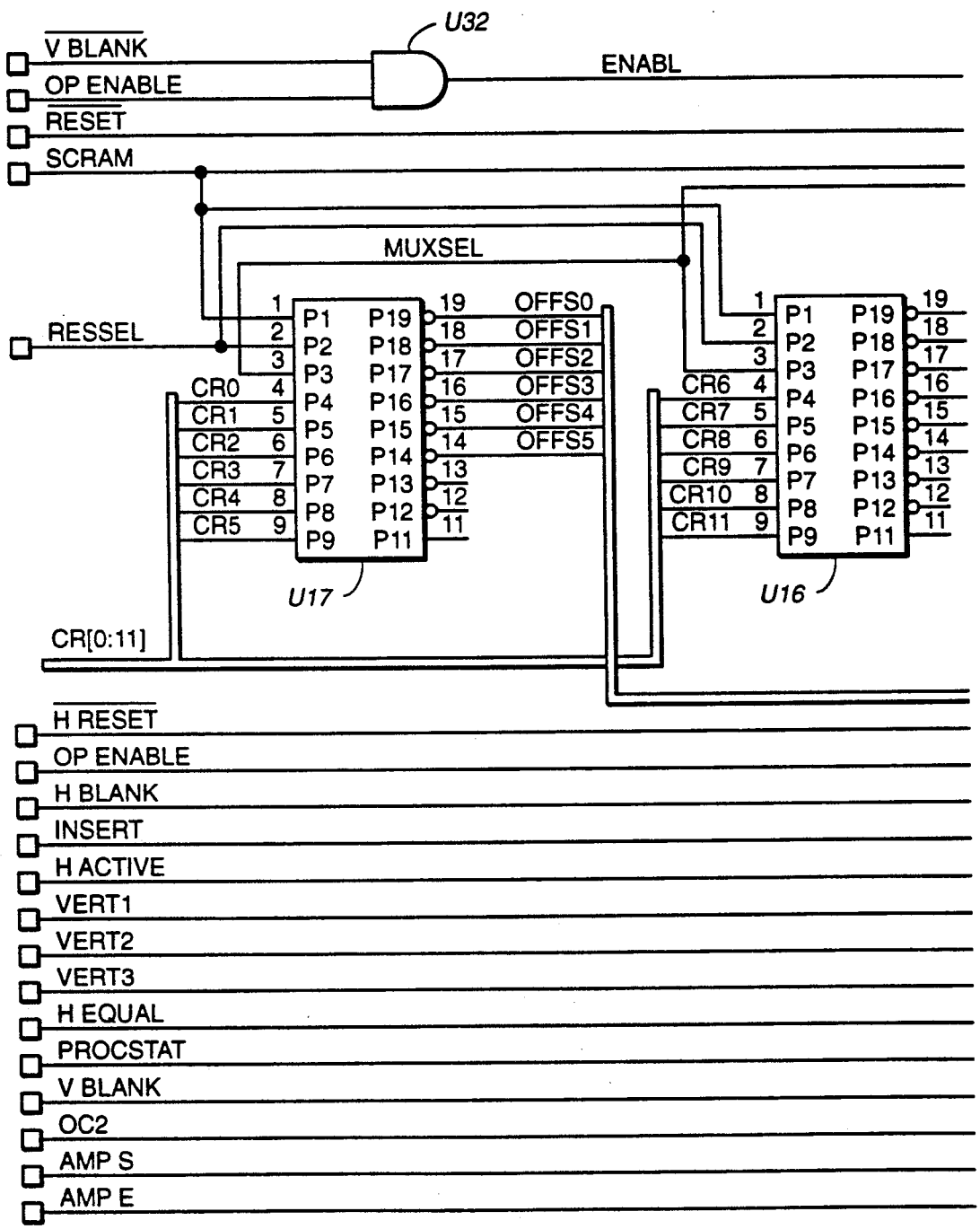
FIG._6A-5

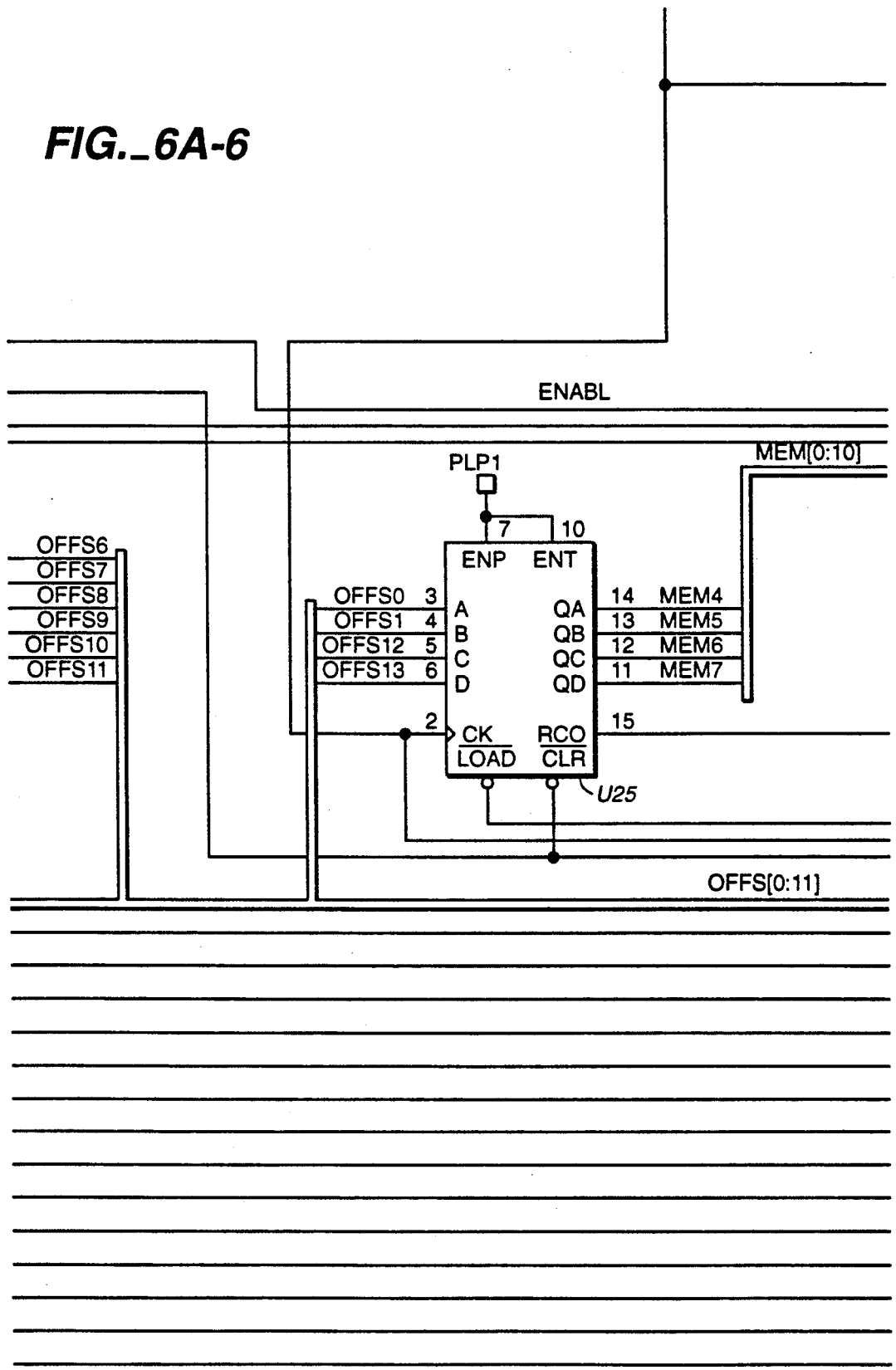
FIG._6A-6

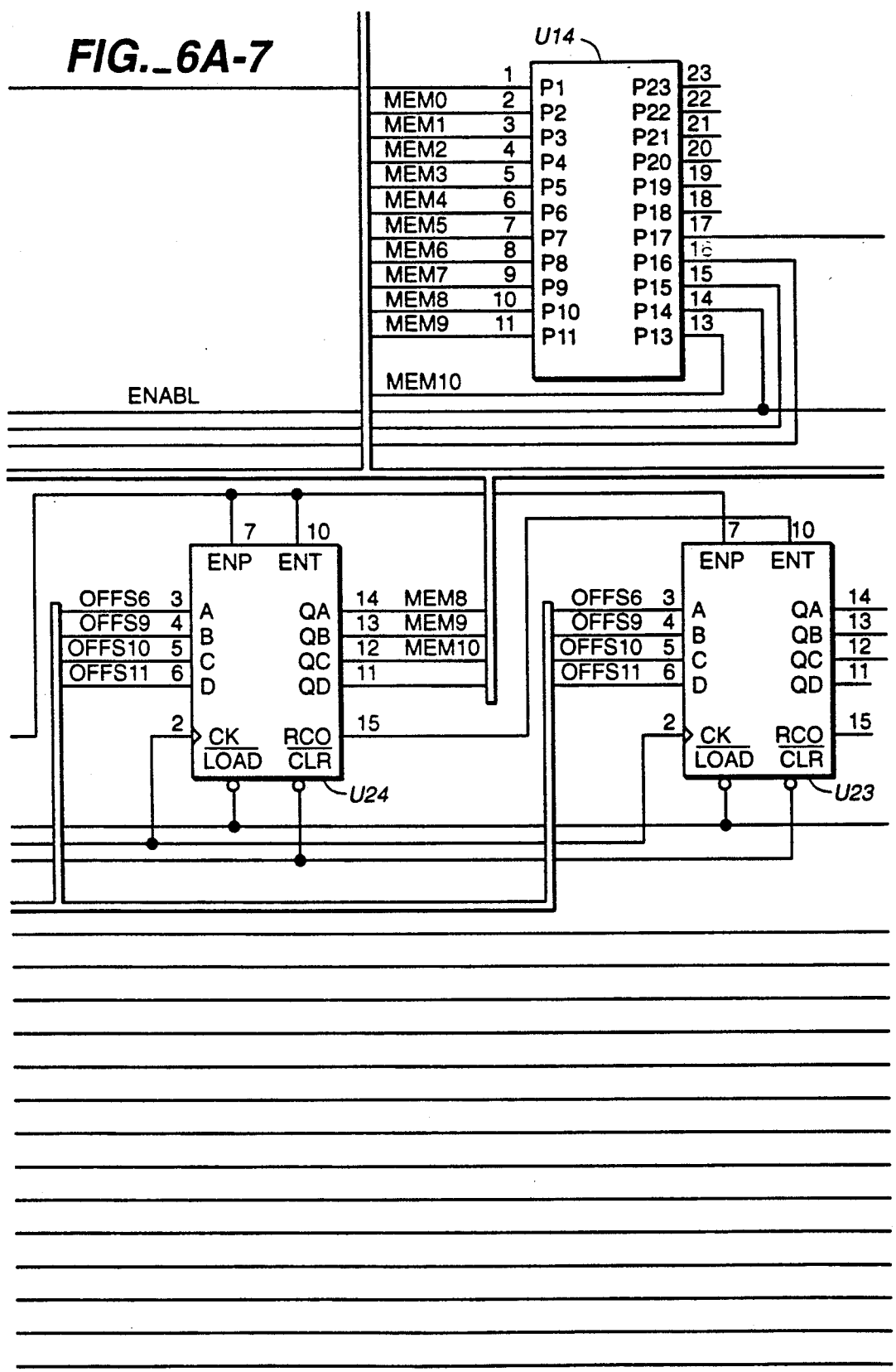
FIG._6A-7

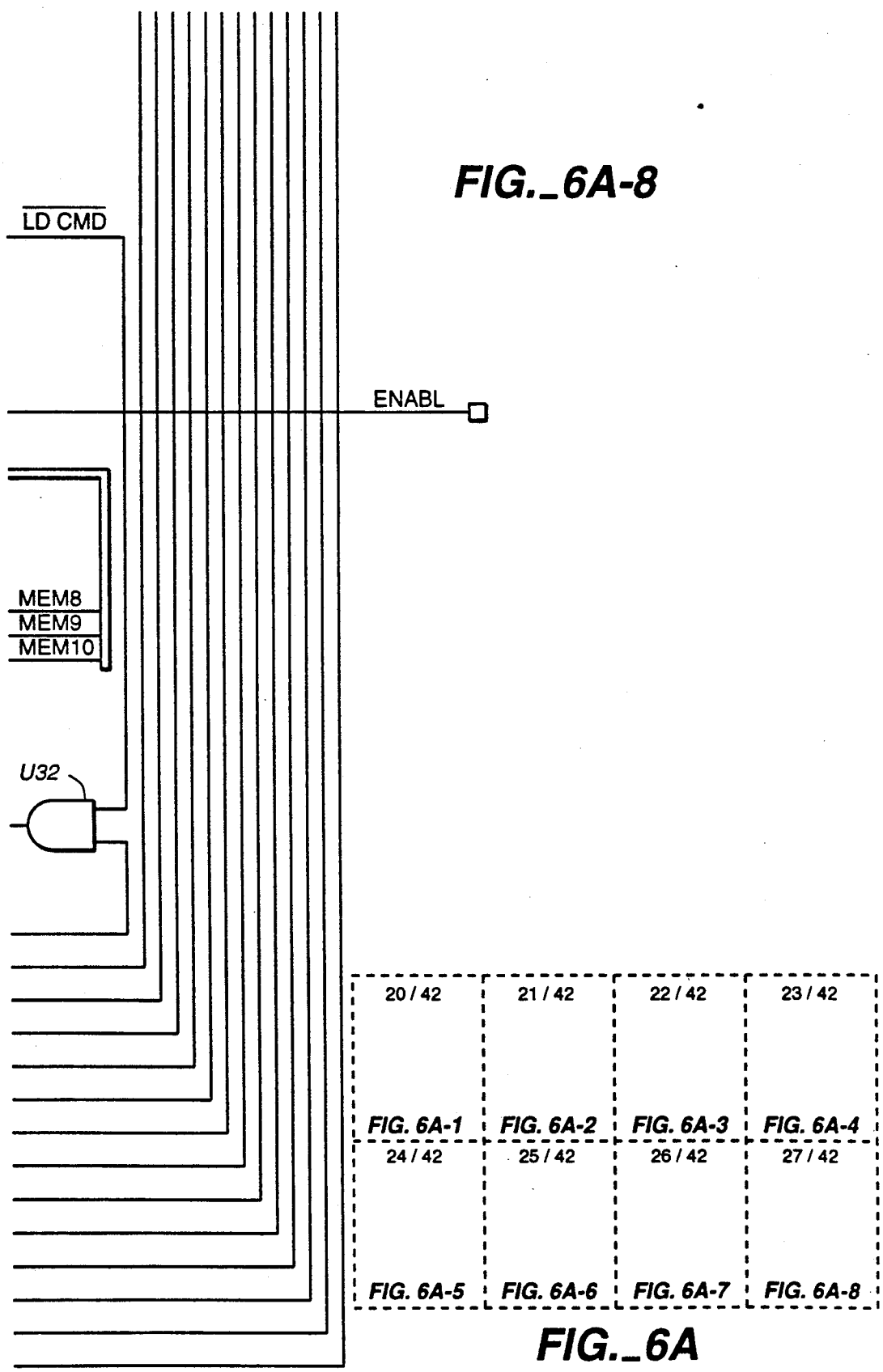

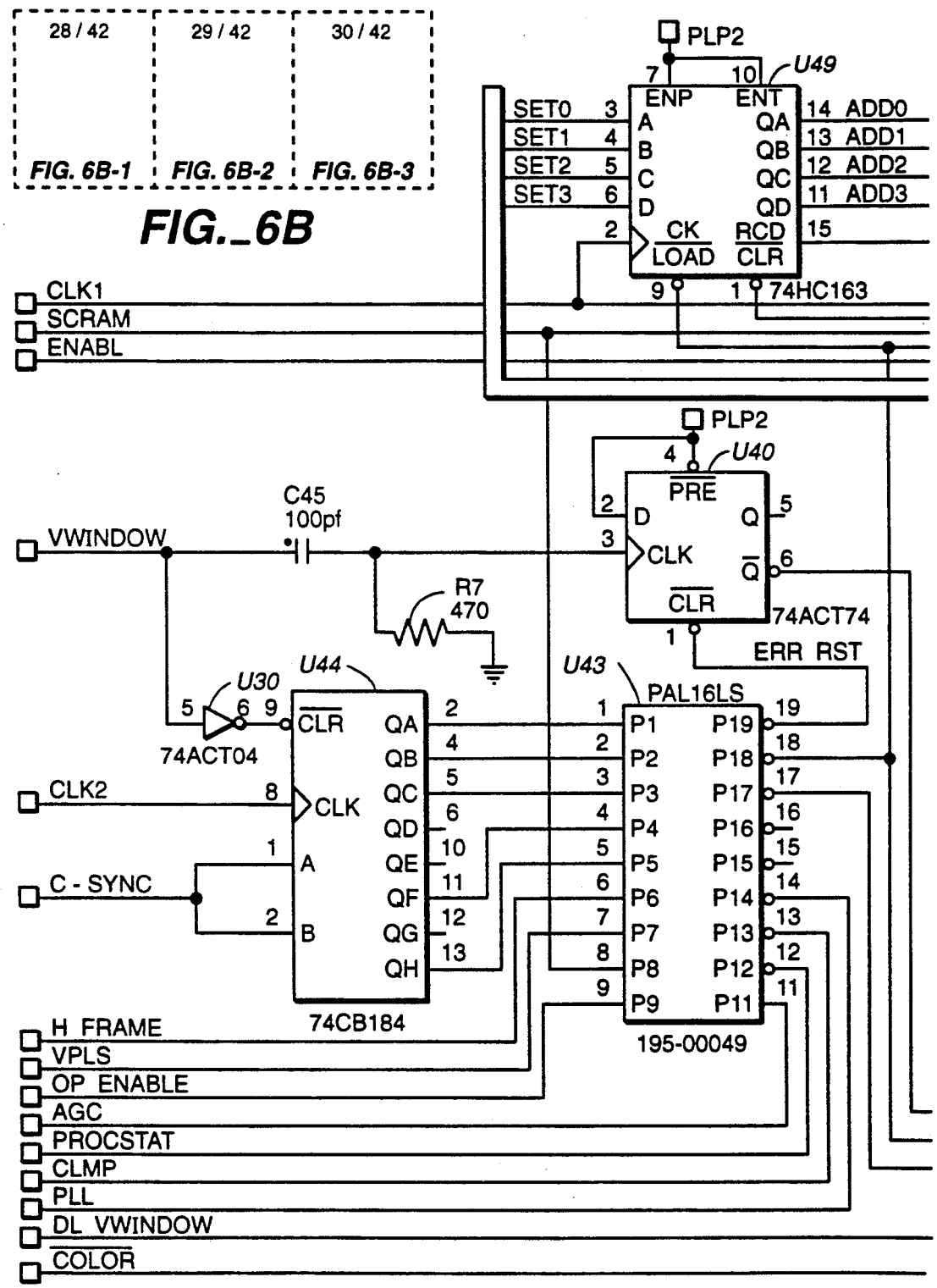
FIG._6B
FIG._6B-1

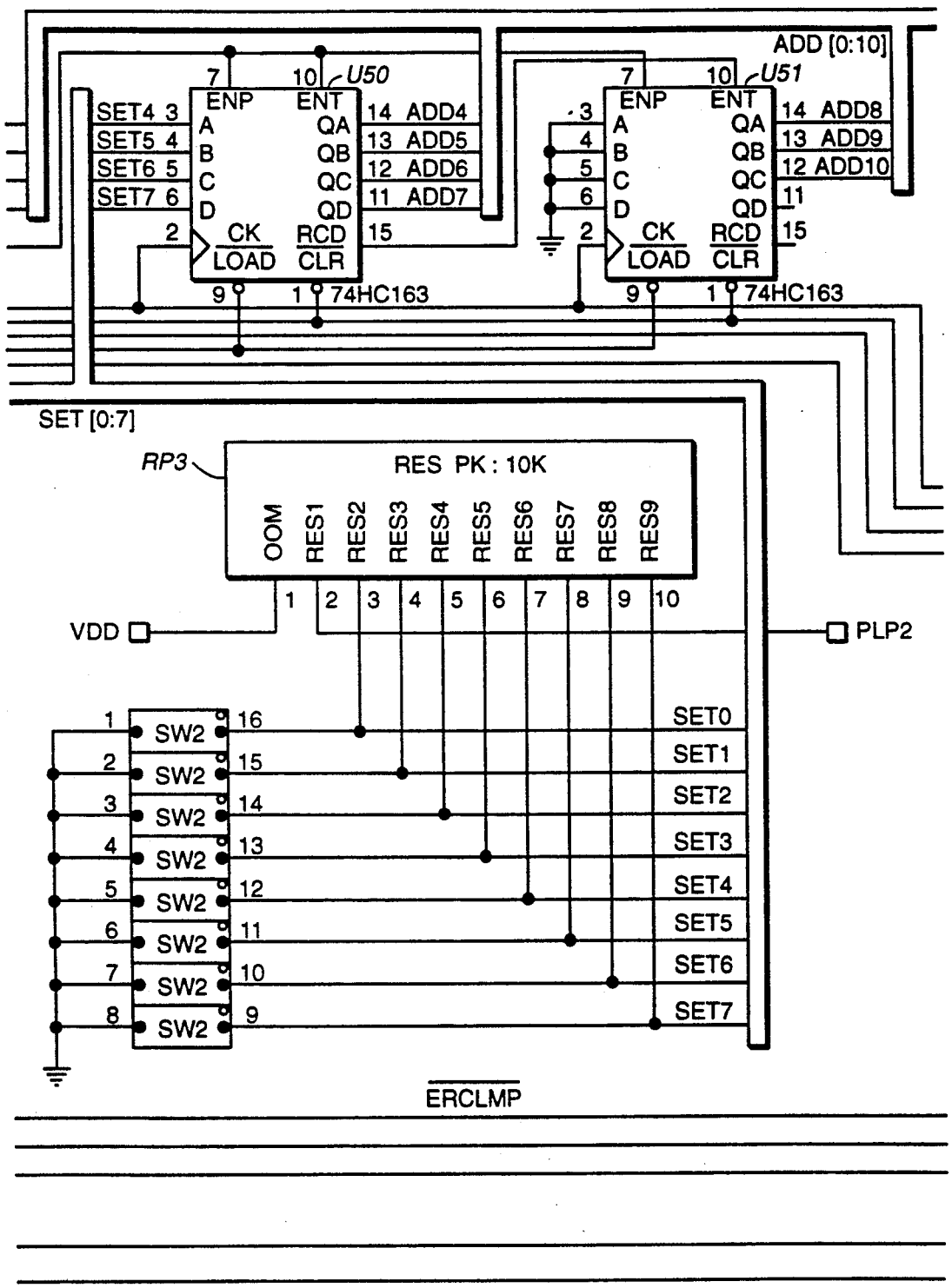
FIG._6B-2

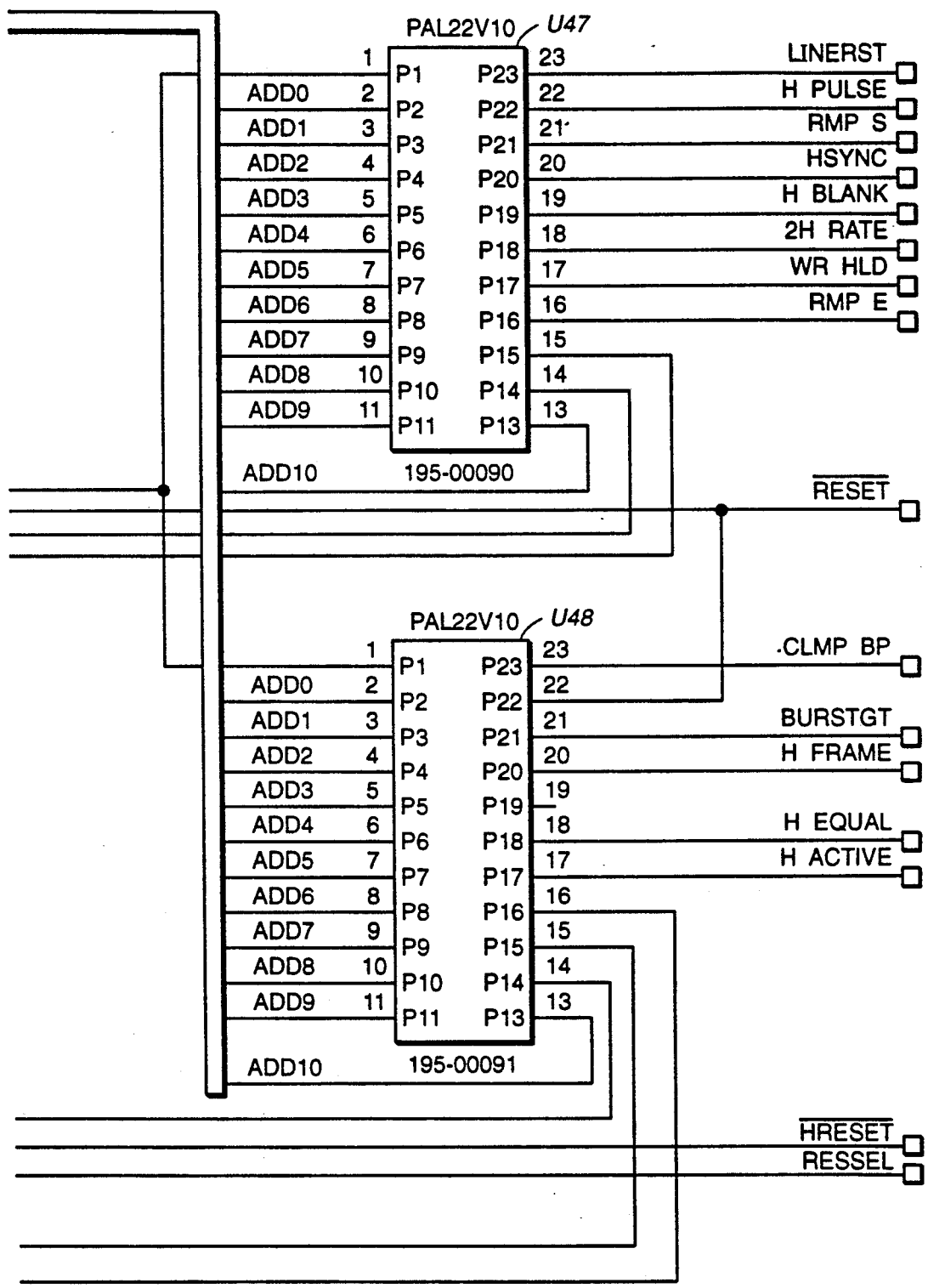
FIG._6B-3

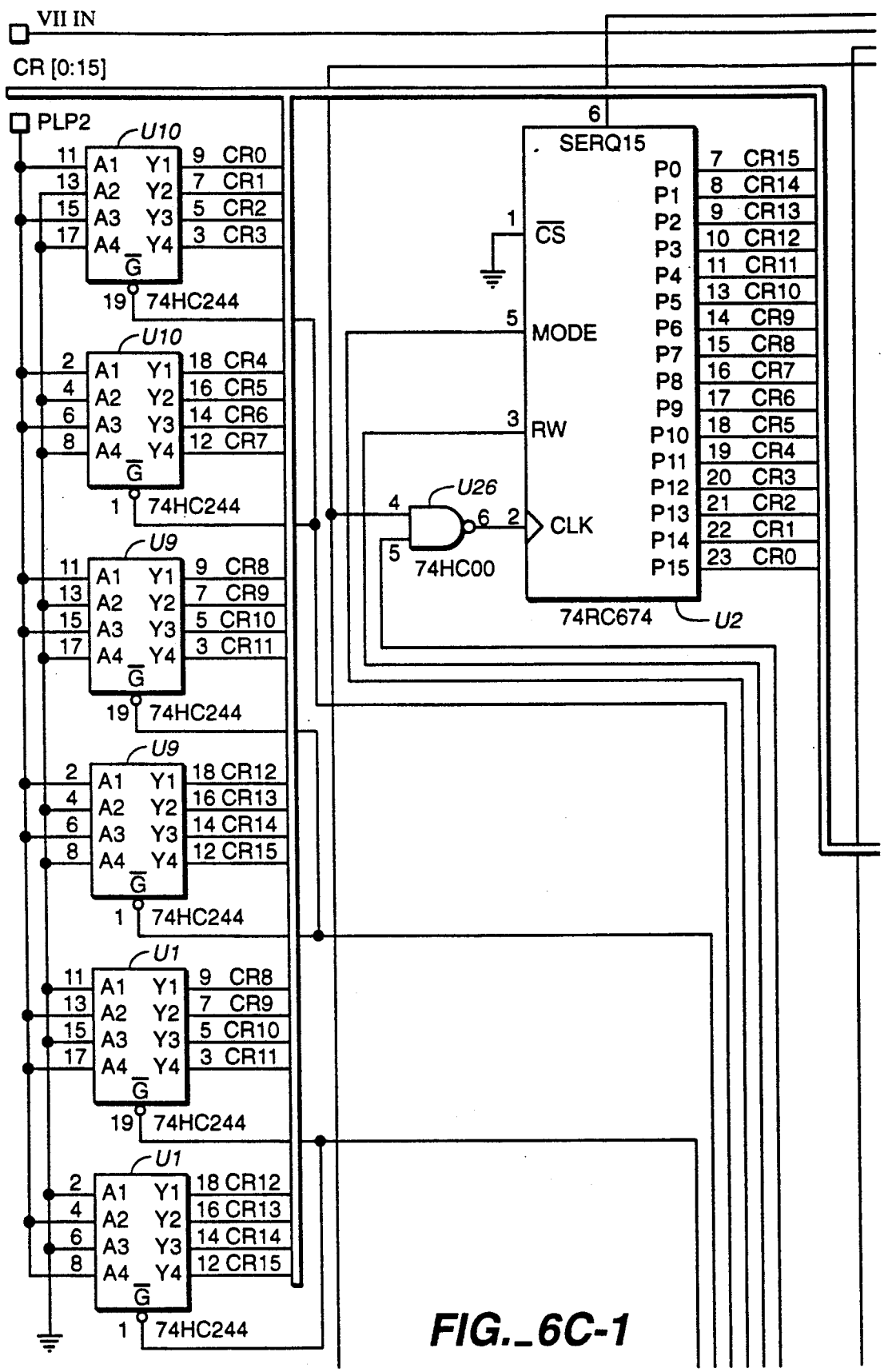
FIG._6C-1

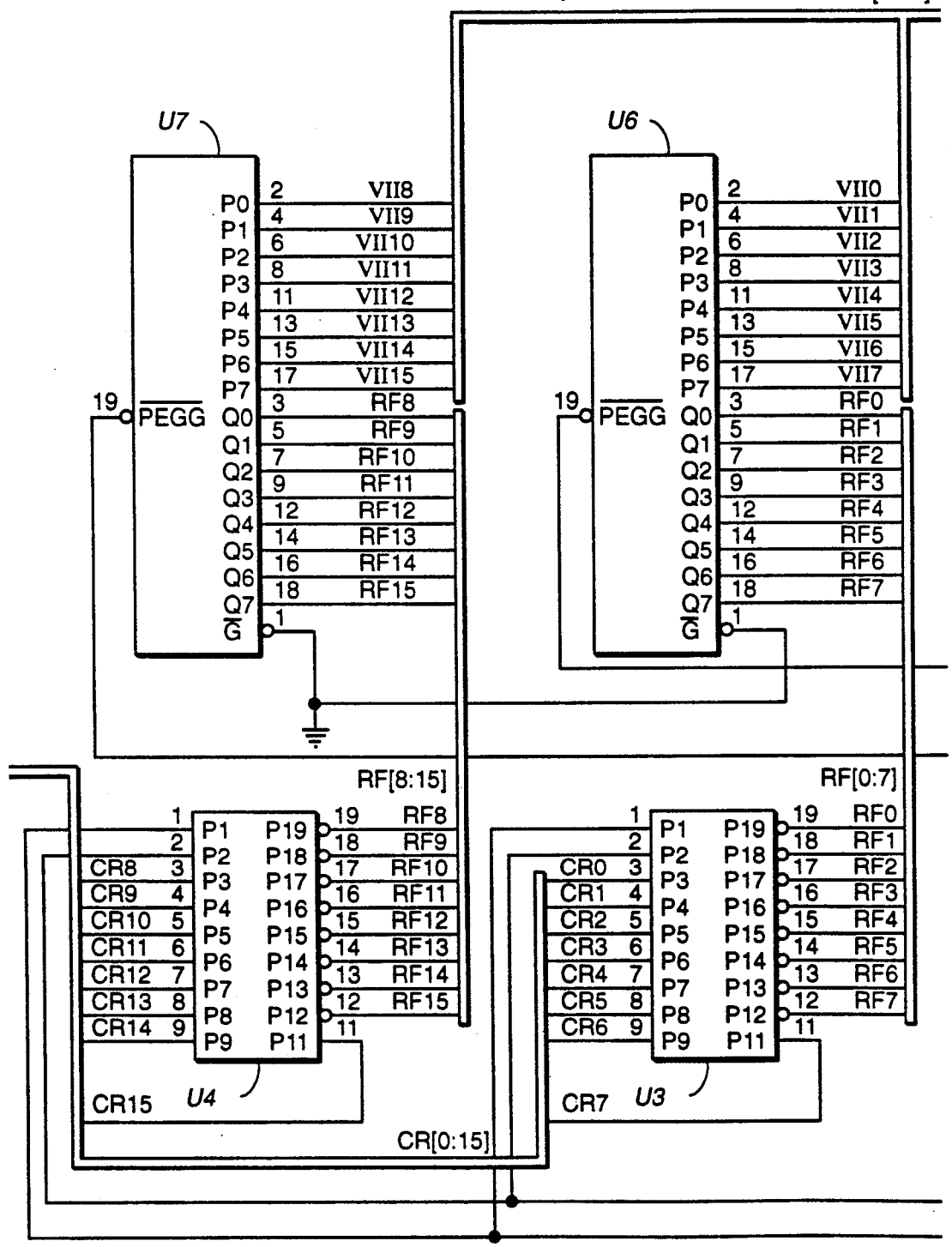
FIG._6C-2

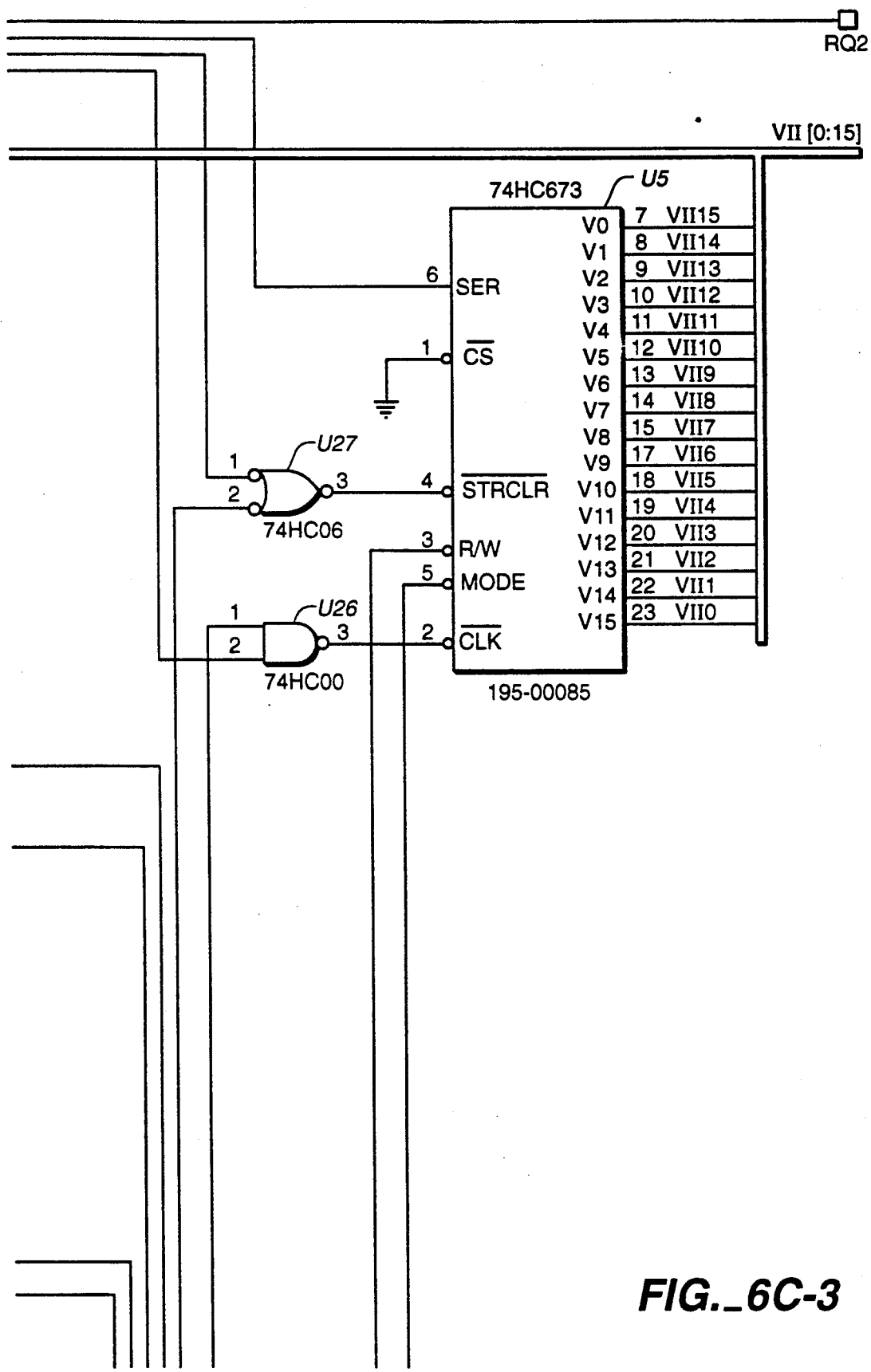
FIG._6C-3

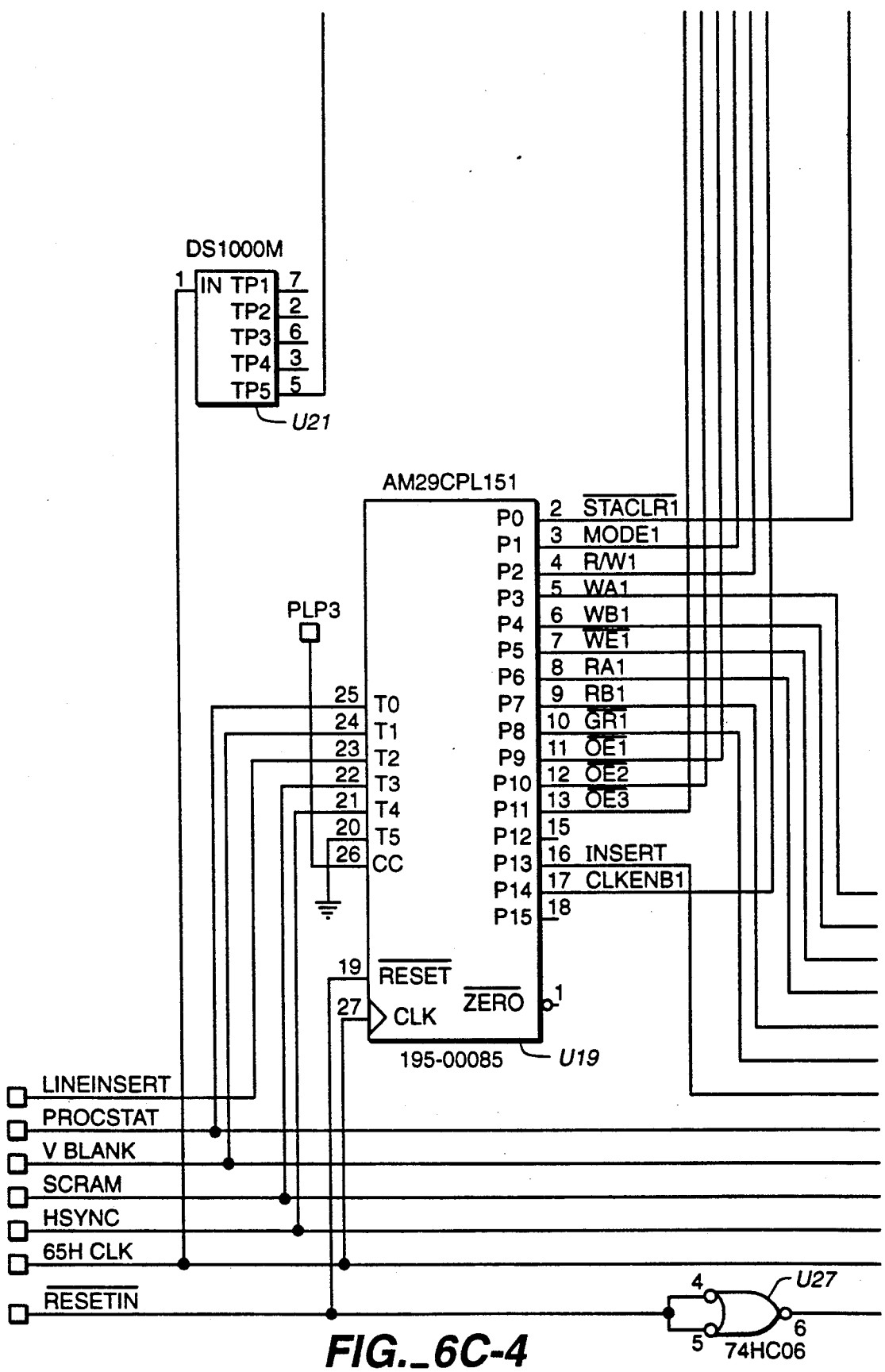
FIG._6C-4

| 31 / 42 | 32 / 42 | 33 / 42 |
|---|---|---|
| FIG. 6C-1 | FIG. 6C-2 | FIG. 6C-3 |
| 34 / 42 | 35 / 42 | 36 / 42 |
| FIG. 6C-4 | FIG. 6C-5 | FIG. 6C-6 |

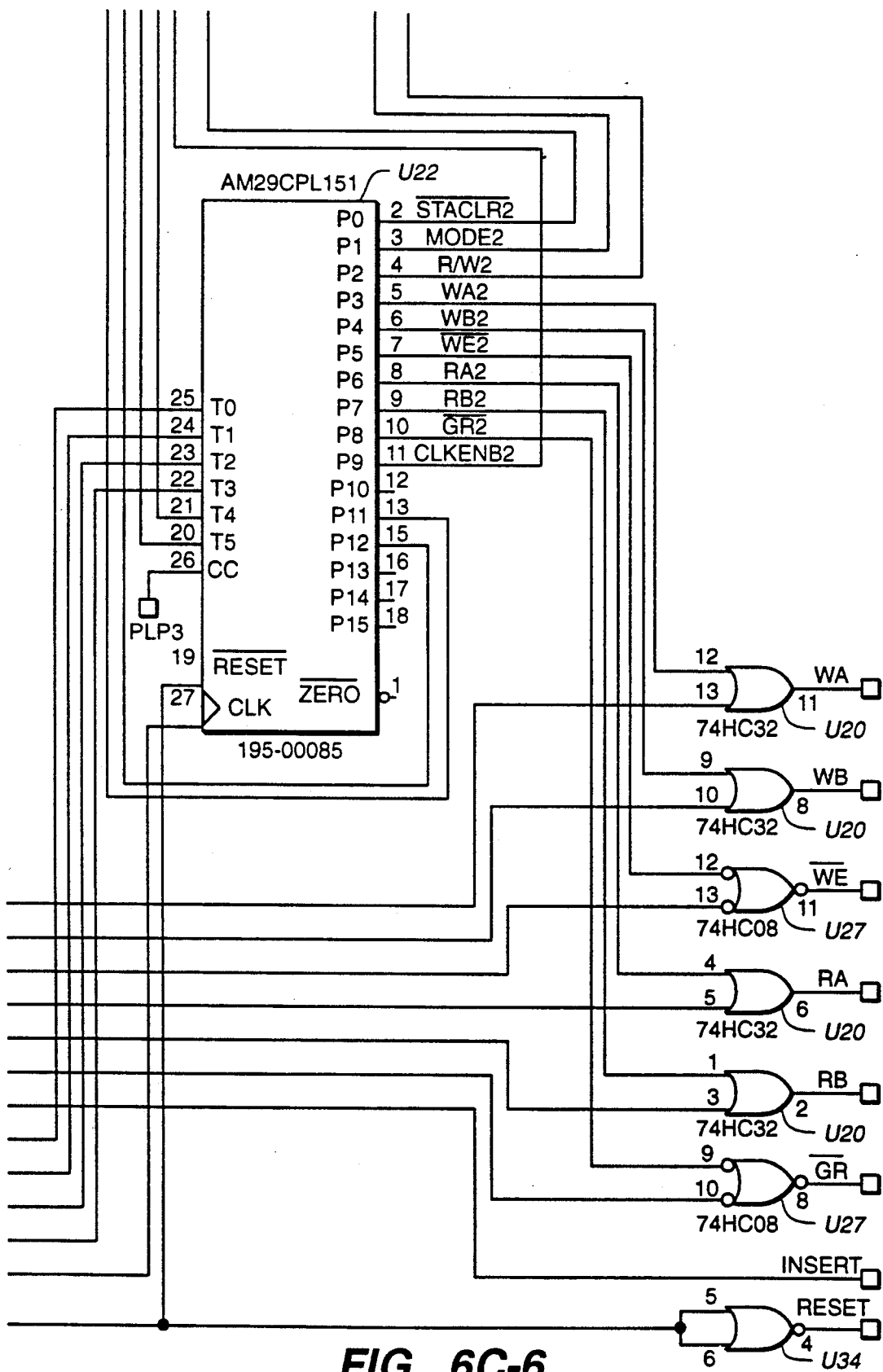
FIG._6C-6

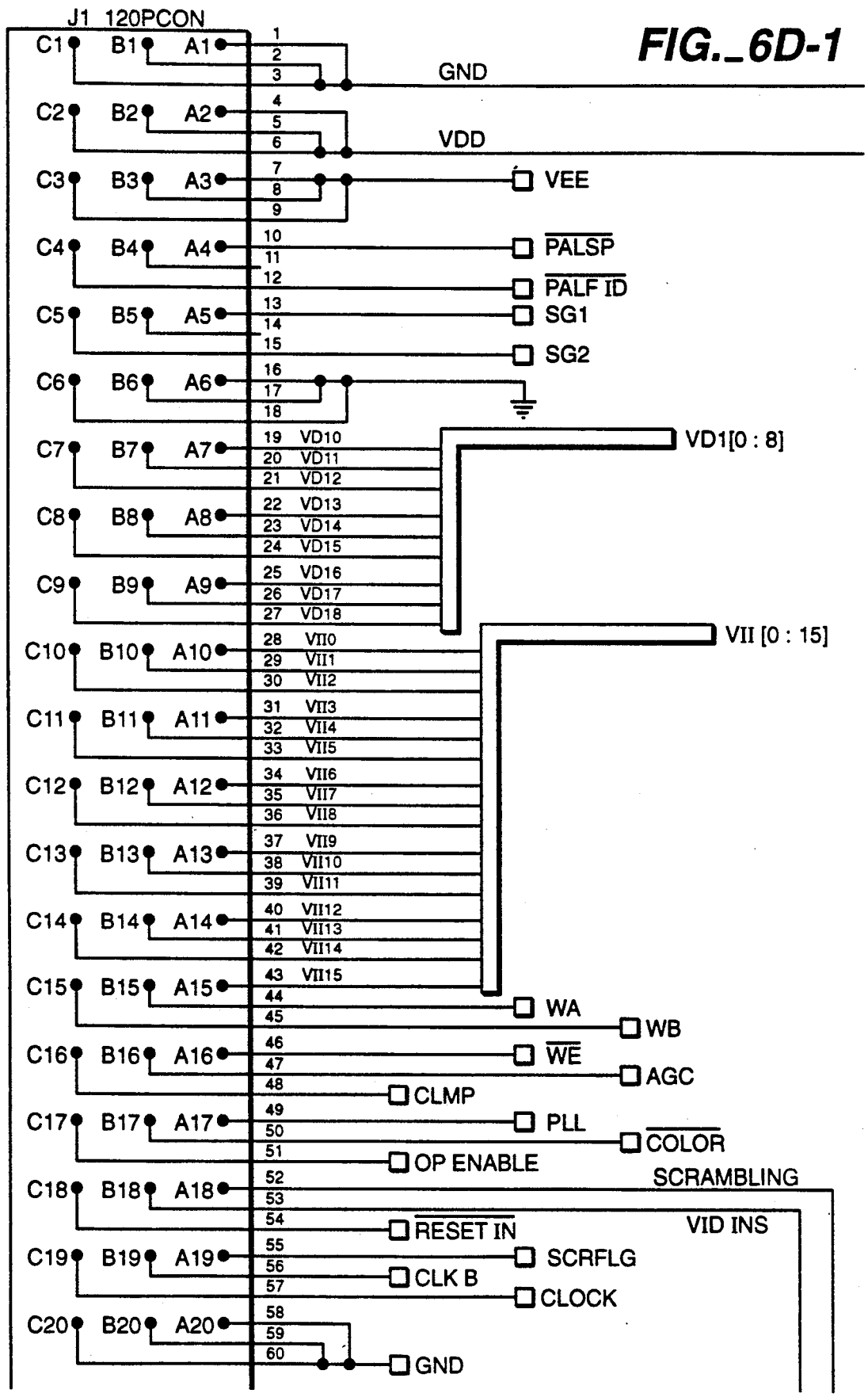
FIG._6D-1

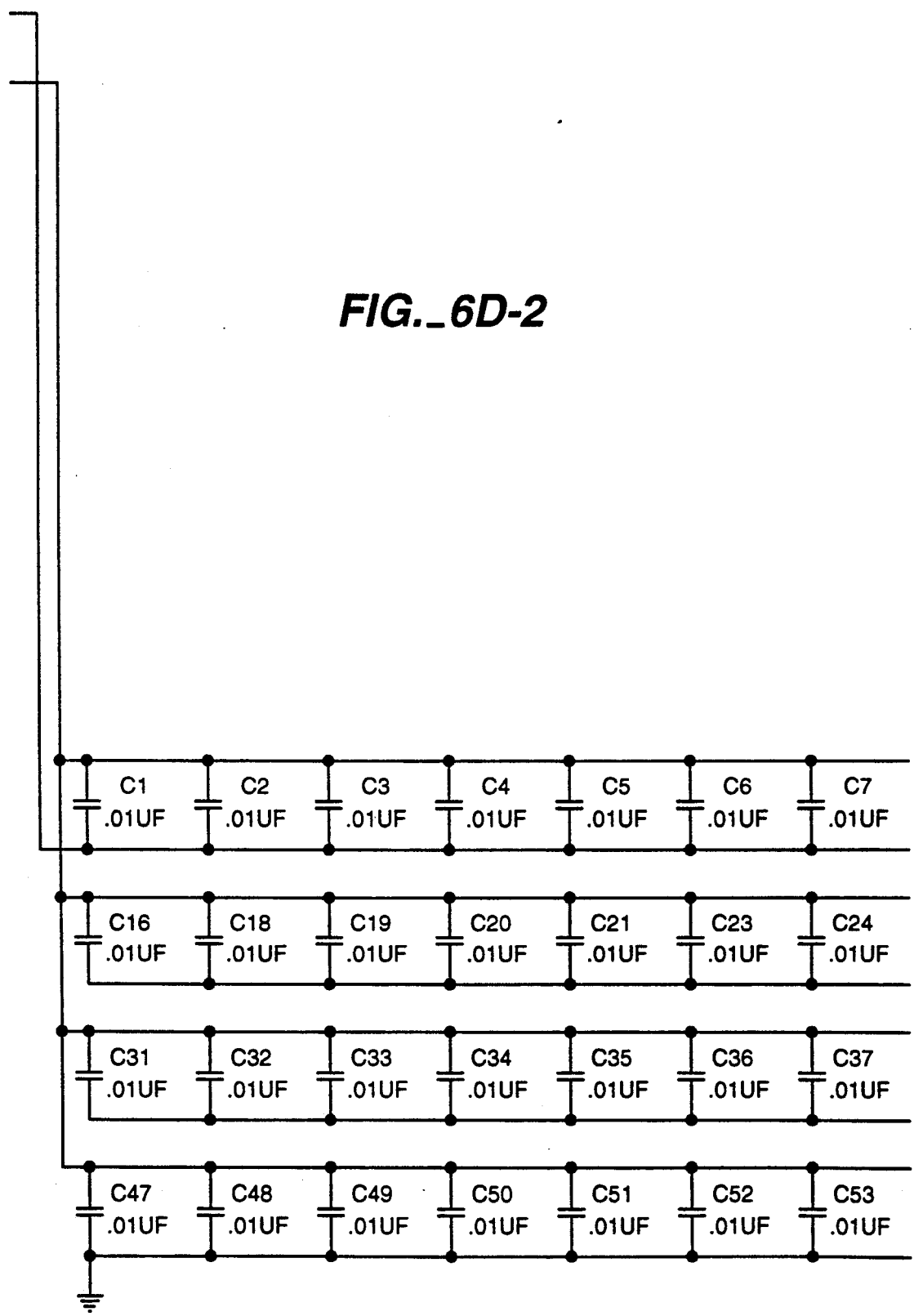
FIG._6D-2

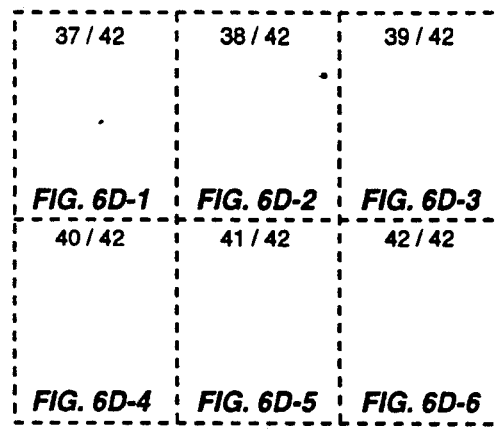
FIG._6D
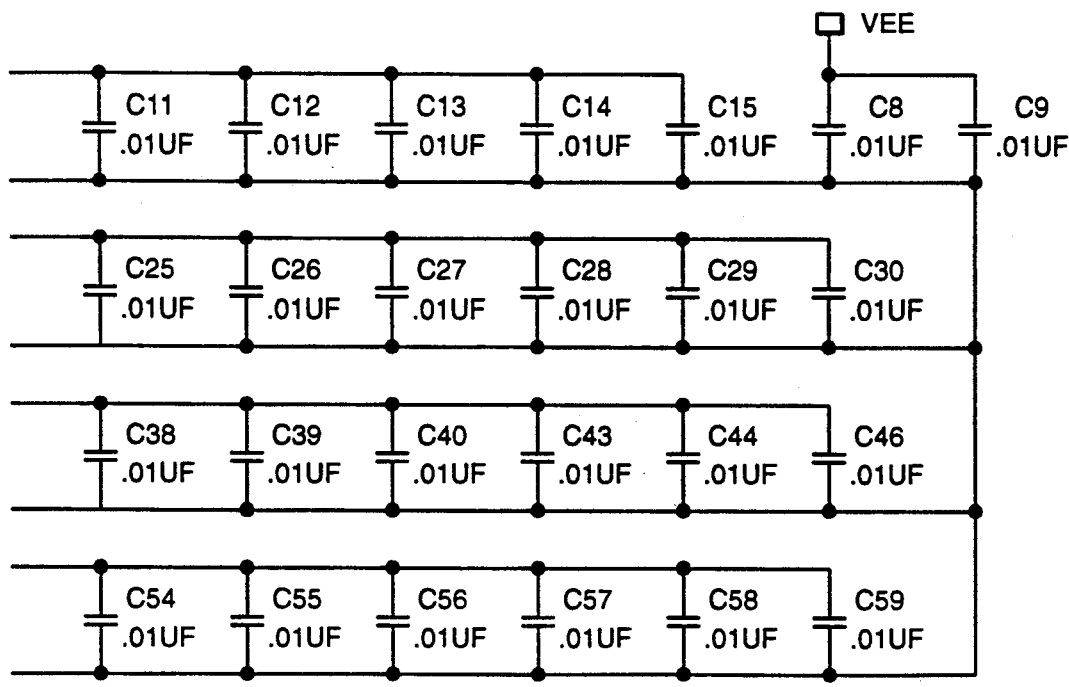
FIG._6D-3

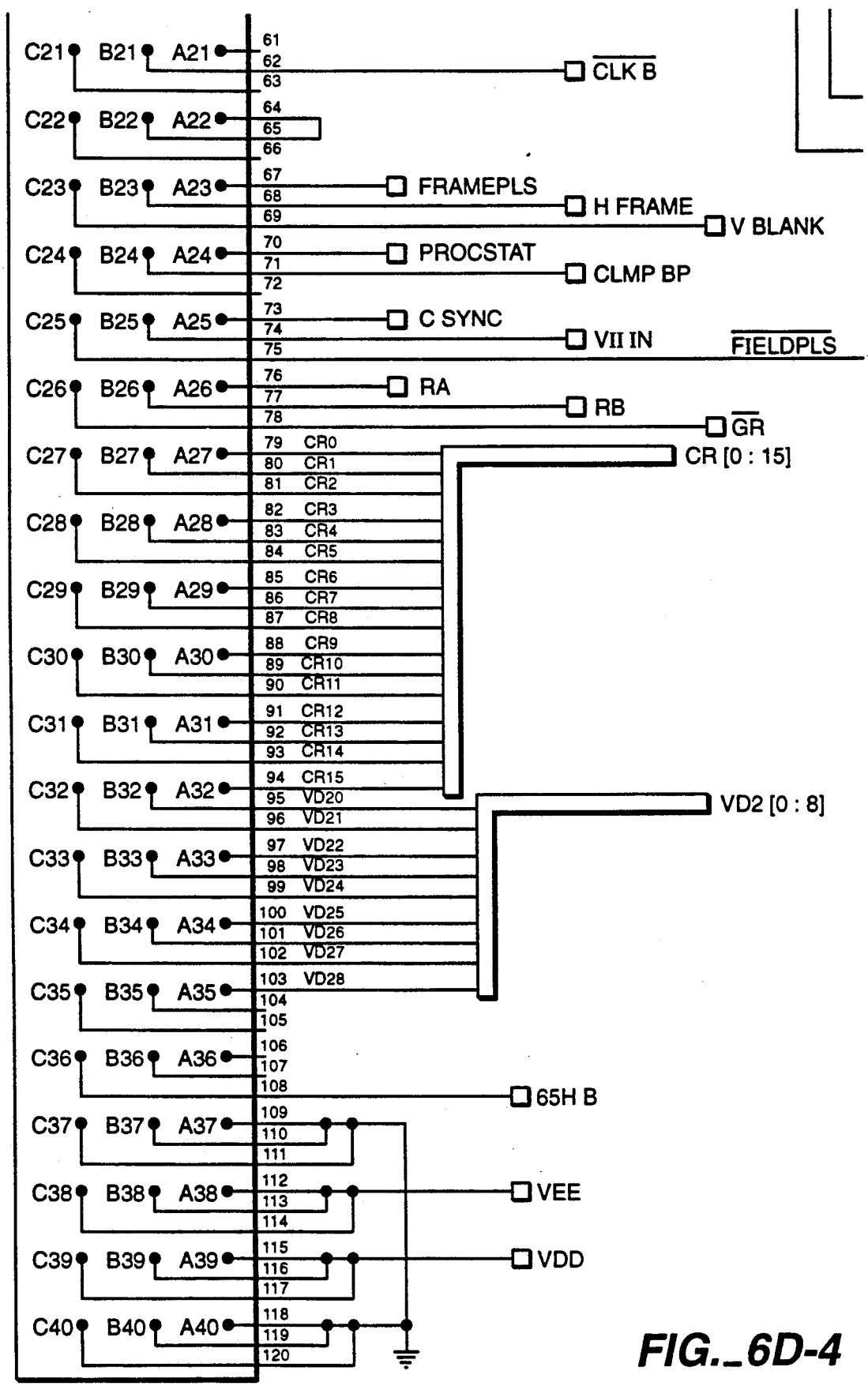
FIG._6D-4

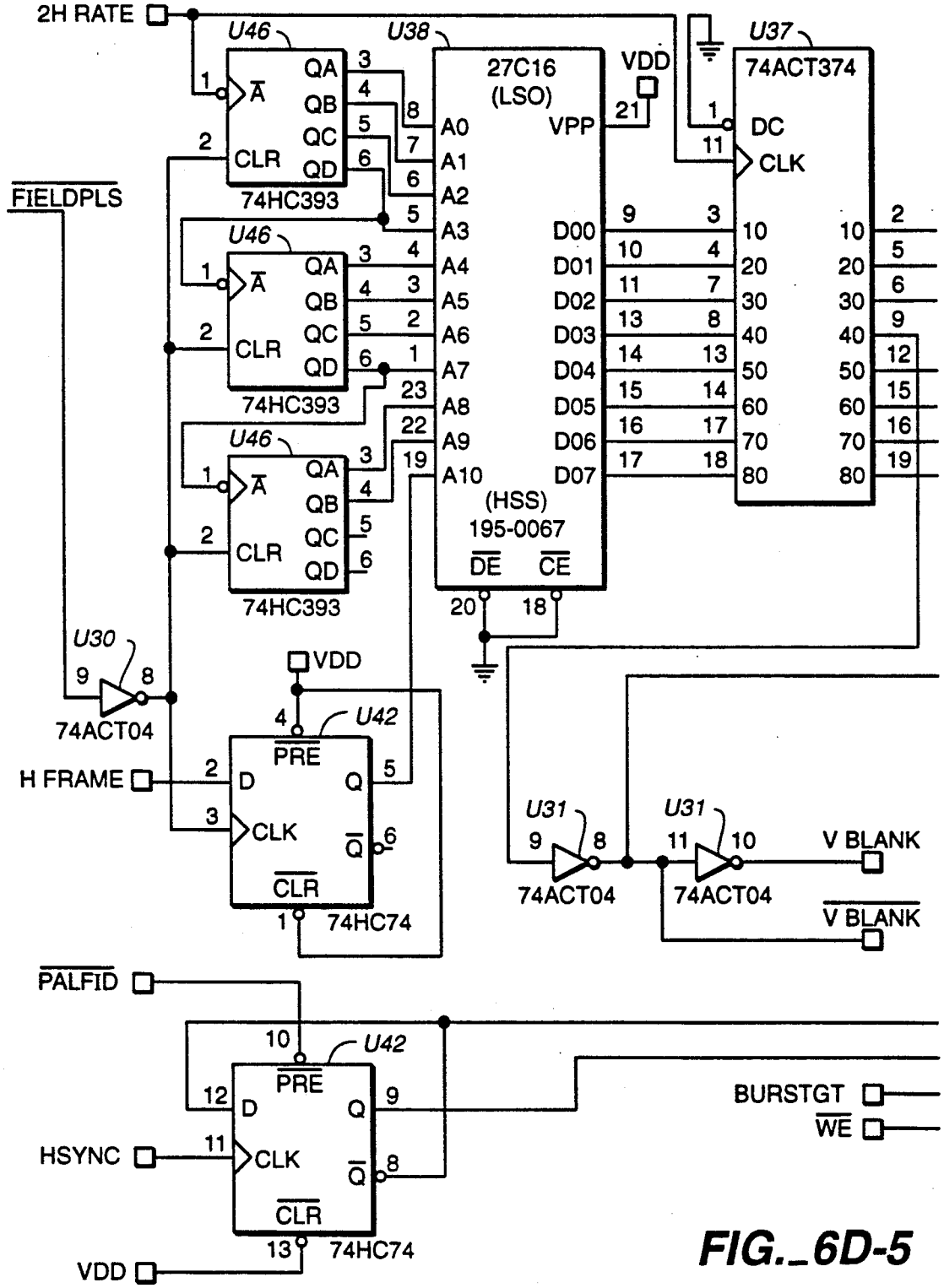
FIG._6D-5

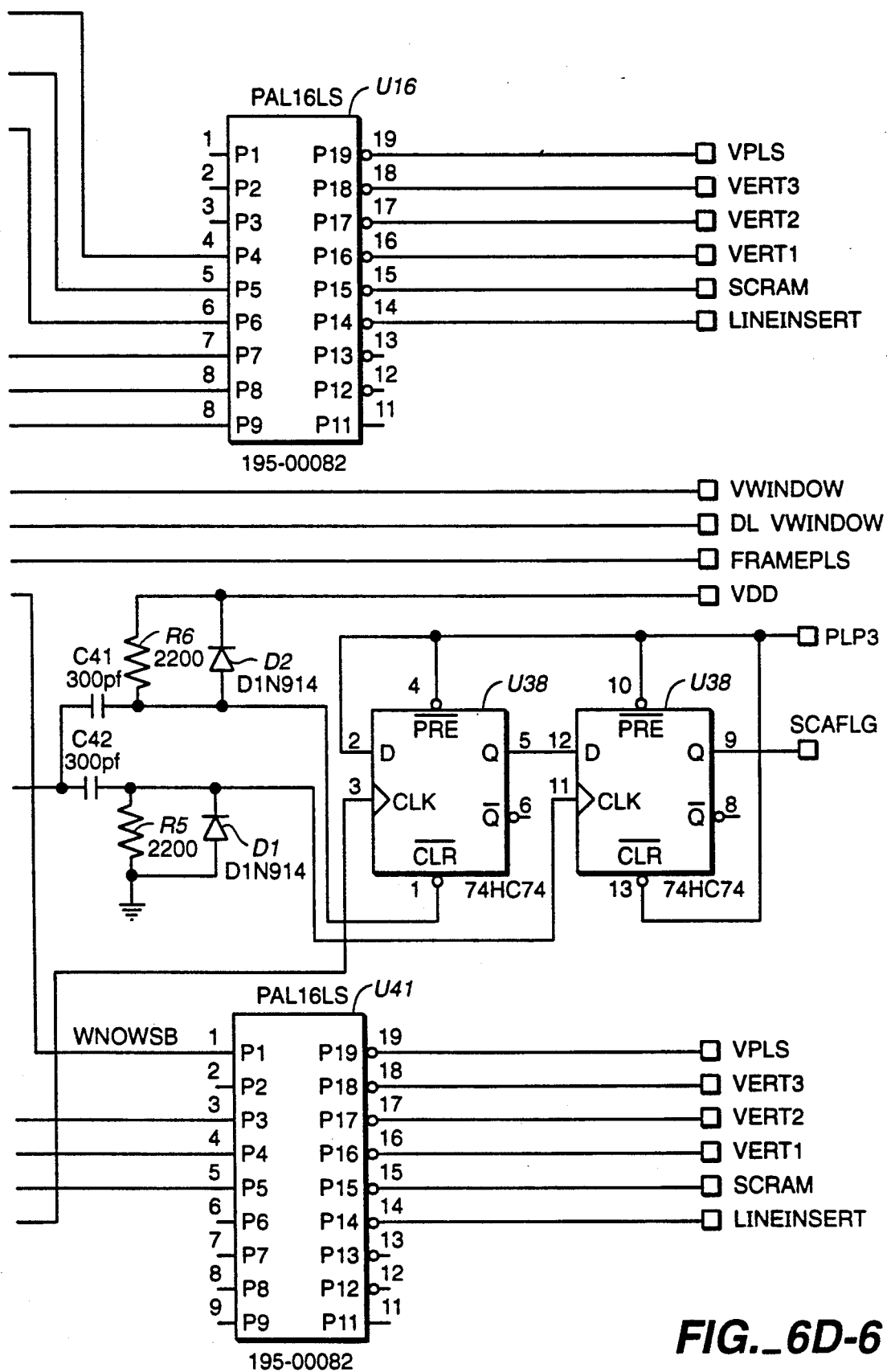
FIG._6D-6

RAMP GENERATION FOR PREVENTING TRANSITIONS WITH INFINITE SHORT RISE TIME IN A VIDEO SCRAMBLING SYSTEM

BACKGROUND OF THE INVENTION

This invention relates to an improvement in a cut and rotate video line scrambling system. More specifically, the invention relates to a ramp generator for eliminating excessive ringing caused by the infinite short rise times which occur at the cutpoints of such a cut and rotate video line scrambling system.

DESCRIPTION OF THE PRIOR ART

Cut and rotate video line scrambling systems are well-known in the art. One video line of unscrambled video as used in such a system is shown in FIG. 1(a), with the video line 12 extending from a first horizontal synchronization pulse 14 and to a second horizontal synchronization pulse 16. Immediately following each horizontal synchronization pulse 14, 16 is the associated color burst 18, 20. Immediately following the first color burst 18 is the starting point A of the active video portion of the line. As shown in FIG. 1(b), during scrambling the starting point A is displaced from its unscrambled position in FIG. 1(a) by the offset distance (which is actually time). This offset creates a break point at point B' where there is an abrupt transition in video level (amplitude) down to the blanking level 24. This break point B' is somewhere in the active region of the video signal, creating a transition from the momentary brightness level at point B' instantaneously to the following blanking, (i.e. "black") level 24.

Since the transition at point B' occurs from one pixel to the next, the rise time of the signal is defined as the duration of one clock pulse, which is 69 nanoseconds for NTSC television and 56 nanoseconds for PAL television systems.

As shown in FIG. 1c), in the scrambling process the creation of the break point at point B' creates a second break point B as the remainder of the line 12 is rotated to the gap formed in the offset because the remainder of the line is rotated to the start of the line. As this scrambled video signal of FIG. 1c) passes through a typical band width limited system (such as the recording path of a conventional VCR or the filters of a broadcast transmission path), the transitions at the break points B, B' are distorted as the frequency components of excess magnitude are removed, resulting in as shown in FIG. 1(d) slewing and ringing during playback. Examples of where such problems occur are a satellite transmission, cable television transmission, or a VCR or VTR. The slewing and ringing are shown in greater detail in the inset portions 32, 34 of FIG. 1(d) showing how the signal is affected in the transition regions at the breakpoints B and B'.

The conventional way to overcome these distorted transitions caused by the slewing and ringing is shown in FIG. 1(e) wherein the scrambled video line information from one end of the line is redundantly copied to the beginning of the line, thus creating an overlap region 38, 40 at the break points B and B', hence eliminating the slewing and ringing. This redundant data overlap 38, 40 allows the removal from the signal of the distorted transition region shown in FIG. 1(d), thus eliminating the scrambling artifacts during the descrambling process.

This conventional solution to the slewing and ringing problem however undesirably results in a descrambled video signal as shown in FIG. 1(f) which is a descrambled version of the scrambled video signal of FIG. 1(e). The descrambled video signal of FIG. 1(f) undesirably includes a shortening of the length of the line, i.e. a shortening of the active video portion of the video line with a black level portion 42, 44 of the line substituted therefor at both points A and A'. This is because the provision of the redundant data (see FIG. 1(e)) eliminates a small portion 42, 44 of the active video where otherwise the ringing and/or slewing would occur. This provides the undesirable result on a television screen of an extension of the horizontal blanking interval, due to the elimination of a portion of the active video of the television picture. Thus the prior art solution to the descrambling of a cut and rotate video line undesirably results in a degraded video picture upon descrambling as shown in FIG. 1(f).

U.S. Pat. No. 5,014,310 issued May 7, 1991 to Walker et al. and entitled "Video Scrambling and Descrambling by Varying Sequence of Segments in Adjacent Video Information Lines" discloses a method of descrambling a cut and rotate scrambled video line using a "wave shaping" segment six pixels long at the cutpoint of the scrambled video line. As disclosed at column 3, beginning at line 6 ". . . the means for forming the scrambled video information lines is adapted for inserting said generated wave shaping information segment into the scrambled video information line between said retrieve segments of said scrambled video information line; and wherein said inserted wave shaping information segment is of a duration equal to said odd multiple of onehalf said given even number of video information samples." This disclosure describes the use of the overlap (as discussed above) which is added at the beginning and end of the scrambled video information lines at column 6 beginning at lines 66.

As pointed out by Walker et al. at column 7 beginning at line 15, "Another reason for adding the overlap is to allow any filters in the system to make a smooth transition into active video. . . . However in the scrambled wave form, the transitions into active video represent the cutpoint in the reconstructed wave form. In this situation, any ringing in filters caused by the transition would be highly visible. The overlap provides a smooth active video segment for the filters to settle."

However, Walker et al. makes no disclosure of the nature of the wave shaping segment which provides the smooth transition from one video signal level to another.

SUMMARY OF THE INVENTION

As described above, the transition at the cutpoint in video levels from blanking level to the active video level problematically has a rise time with frequency components exceeding the bandwidth of the transmission system. The solution to this problem in accordance with the invention is to provide a synthesized ramp defining a series of video amplitudes between the two video levels. Thus a smooth transition is provided between the blanking level and the video signal level at the cutpoint, the transition being a ramp which in one embodiment approximates a raised $\sin^2$ (S-curve) response. In the preferred embodiment of the invention this $\sin^2$ response is synthesized by three successive video pixels preceding the cutpoint being replaced by levels of video signal respectively of $\frac{1}{8} \cdot D$ plus the blanking level, ⅓·D plus the blanking level, and ⅔·D plus the blanking level, where D is the difference in video amplitude between the video level at the cutpoint B of FIG. 1c) and the blanking level.

Also in accordance with the invention a similar ramp is synthesized at the second break point B' of FIG. 1c) near the end of the video line, where the three pixels following the cutpoint B' are replaced respectively with video levels of ⅔·D plus the blanking level, ½·D plus the blanking level, and ⅓·D plus the blanking level, i.e., the same values as the transition at the beginning of the video line but in reverse order so as to provide a downward sloping (trailing edge) synthesized ramp.

Thus advantageously the prior art shortening of the descrambled video line (see FIG. 1(f)) is minimized by instead providing a synthesized ramp for a smooth transition between the two video levels at the cutpoint. The smoothing of the transition eliminates the high frequency components that cause the undesirable ringing and overshoot as shown in the prior art in FIG. 1(d). Since the undesirable ringing and overshoot are reduced, the number of pixels required in the overlap region at the cutpoint are also reduced, and the length (duration) of the redundant data at the cutpoint is minimized.

Thus, a synthesized ramp is created at a first cutpoint in the video line which is a leading edge. For this leading edge cutpoint, digital circuitry is provided which calculates by looking ahead what the value of the video levels will be at the synthesized ramp, and then the video signal is delayed by a predetermined amount of time in order to create the ramp ahead (in terms of time) of the video transition. The delay is needed to provide room (in terms of time) for the ramp. The length of the delay is that of the number of pixels in the ramp plus one pixel for the actual calculation time. Thus the video signal at the transition point is held in memory and then delayed by a delay line, the pixel steps which form the synthesized ramp are calculated to provide the needed transition in video levels, and those pixel steps are then inserted into the video signal just before the actual transition occurs. In other words, for a leading edge transition point (cutpoint) which is a transition from blanking up to active video, a ramp three pixels in duration is inserted into the video signal immediately prior to the cutpoint. In order to insert the ramp at the desired location, the normal video signal is delayed and as the normal video signal images from the delay line the active video level is captured, sampled, and used to calculate a ramp up to that level from the blanking level; then the calculated (synthesized) ramp is inserted into the video signal at a portion of the video signal which has been blanked.

Similarly, at a trailing edge cutpoint B' as shown in FIG. 1(d), the video signal is held in memory, the values of the downwards transition at the cutpoint to synthesize a ramp at the cutpoint are calculated, and the amount of delay for the video signal provided by the delay line is sufficient to overcome processing delay to insert the ramp into the video signal immediately after the transition. Thus at the trailing edge transition (a transition from active video down to the blanking level), the circuitry captures and holds the last video level prior to the transition and calculates a downwards sloping ramp to the blanking level. In this case, the delay line overcomes the processing delay while the ramp values are being calculated.

In one embodiment of the invention, latching multiplexers determine where the input select circuitry selects the break point and the level at the break point either for the rising transition at the beginning of the video line or for the trailing transition at the end of the video line.

BRIEF DESCRIPTION OF THE DRAWINGS

FIGS. 1(a) through 1(f) show prior art cut and rotate video scrambling.

FIG. 2 shows a block diagram of a ramp generator in accordance with the invention.

FIGS. 3, 4 and 5 show details of the circuitry of FIG. 2.

FIGS. 6(a) to 6(d) show a scrambling system video processor including the ramp generator in accordance with the invention.

DETAILED DESCRIPTION OF THE INVENTION

Figure 7:
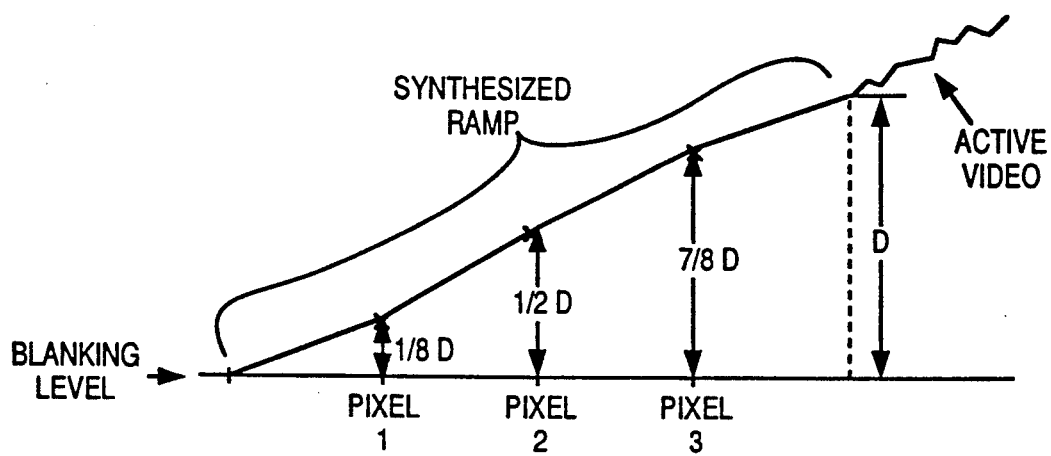
FIG. 7 shows a synthesized waveform in accordance with the invention.

The following detailed description is of a ramp generator circuit which is a portion of a video scrambling system. Circuitry similar to this video scrambling system is also described in co-pending and commonly assigned U.S. Pat. Application Ser. No. 07/743,049, entitled "BURST PHASE CORRECTION SYSTEM FOR VIDEO DESCRAMBLING", filed Aug. 8, 1991, inventor K. Heinz Griesshaber, atty. docket no. M-1587, incorporated herein by reference. The video insertion and ramp generator in accordance with the present invention is provided in place of one of the programmable devices of the above referenced system, as described below.

One embodiment of the ramp generator and associated video signal insertion circuitry is shown in FIG. 2 in block diagram form as implemented in a field programmable gate array. Shown in the upper left hand portion of the figure is a 9-bit parallel video input bus VDI which provides signals to the input pads VDI0, VDI1, ..., VDI8 and the associated input buffers U52, U53, ..., U60. This buffered bus VDI is connected to the input terminals by a 9-bit wide input latch U1 and also to the input terminals B0, B1, ..., B8 of both the two latch multiplexers U9 and U10. Nine bit latches U2, U3, and U4 connected together in series are a three-stage delay line allowing storage of the video signal level at the cutpoint B of FIG. 1(b).

Multiplexers U9 and U10 select the data directly from the input bus VDI if the counter U17 is triggered by the start command, and from the output of latch U4 if the counter U17 is triggered by the end command. The commands start, end and reset are provided to the counter U17 by signals on the similarly labelled terminals at the middle left hand portion of FIG. 2. The start command will cause the UD output of counter U17 to go high, selecting the "B" input of multiplexers U9 and U10 via the S (select 1) input. Also the LTCH (latch) output of counter U17 will go high for one clock cycle and enable the multiplexers U9 and U10 to latch the value of one video pixel and hold it until the next enable. Multiplexers U9 and U10 provide identical functionality in parallel. While multiplexer U9 supplies the digital signal to adder U11, multiplexer U10 supplies the digital signal to subtractor U15.

The calculations of the value D, i.e., the difference between the video signal level at cutpoint B and blanking level as well as the intermediate values of ⅛ D plus blanking level, ½ D plus blanking level, and ⅞ D plus blanking level are performed by adders and subtractors U11, U12, U15, and U16. The output terminals Yo, Y1, . . . , Y8 of multiplexer U9 are connected to the B input (terminals B0, B1, . . . , B8) of the 9-bit subtractor U11 to calculate the difference (designated "D") between the video blanking level and the video level at the cutpoint B. The digital value representing the blanking level signal (ground and VCC) is hardwired to the A inputs, i.e., terminals A0, A1, . . . , A8 of subtractor U11. The calculation of the fractions of ½·D and ⅛·D are created by shifting towards the lower bit and are added to the blanking levels in the adders U16 and U12 respectively. The input terminals B0, B1, . . . , B8 of subtractor U15 are connected to the second multiplexer U10 output terminals Y0, Y1, . . . , Y8 and subtractor U15 thus subtracts ⅛·D from the video blanking level at cutpoint B, thus calculating a video amplitude ⅞·D plus blanking level. The resulting waveform is shown in FIG. 7. The results, i.e., the output signals from U11 , U12, U15, U16 are reclocked by the latches U7, U8 and U46 and then selected together with the delayed video (from latch U47) by the multiplexer U43, providing the VDL bus [VDL 8 ... 0] to the A input of multiplexer U14.

The up/down counter U17 provides a selection sequence for multiplexer U43. This selection sequence is the count 0 . . 1 . . 2 . . 3 . . 0 to ramp up at the cutpoint B near the beginning of a video line, and the count 0 . . 3 . . 2 . . 1 . . 0 to ramp down for the cutpoint B' near the end of a video line. The ramp up and ramp down sequences are triggered by the start and end commands provided at the associated input terminals. Counter U17 also provides the enable and input selection signals for the multiplexers U9 and U10.

The remaining circuitry shown in FIG. 2 provides the insertion and blanking functions for the video signal via the B input of multiplexer U14. The inserted signal of the scrambling seed (described below) and digital blanking functions are selected via circuit U13. By controlling the selection inputs respectively A, B, C, D of select circuit U13, a numerical value (video amplitude) of 0, 3, 119 or 351 can be placed onto the bus VDM and inserted onto the video output bus VDG shown at the right hand portion of FIG. 2 by controlling multiplexer U14.

Bus VDM connects the output of select circuit U13 to the B inputs of multiplexer U14.

As described above, no synthesized ramp is provided if the amplitude of the video level at the cutpoint is less than 128. This function is performed by signals at input terminals VD38 and VD37 (center left hand portion of FIG. 2) which are connected respectively to terminals BIT8 and BIT7 of counter U17. The signals start and end disable counter U17 when the video level at the transition point (as latched into U9) is within a predetermined value of the blanking level (i.e., 128 units); thus when counter U17 is disabled, no ramp is synthesized.

The signals provided to the C input terminals of multiplexer U43 are as shown provided via latch U8 which in turn is connected to output terminals S of adder U16. The output signal of adder U16 is the blanking level plus one-half of the distance between the blanking level and the video level at the cutpoint i.e. B+½·D. This is the middle step in both the upward sloping ramp and the downward sloping ramp which are to be synthesized.

The last set of input signals to multiplexer U43 is on terminals D thereof which is provided via latch U46 from output terminals S of subtractor U15, which provides the blanking level plus the value of the distance between the blanking level and the cutpoint minus one-eighth of the distance between the blanking level i.e. B+⅞·D.

In tracing further backwards in the circuitry, the breakpoint video amplitude is valued and latched in latches U9 and U10. Two such latches U9 and U10 are connected in parallel in order to provide sufficient current to drive the load of the downstream logic circuitry.

Multiplexer latches U9 and U10 (as described above) are each controlled by inputs on terminals S and E thereof as well as by the inputs on the clock terminals thereof. E will enable the clock in the multiplexers U9 and U10 to latch the first pixel at the breakpoint B or the last pixel at the breakpoint B'. The selection of the breakpoint B vs. B' is determined by the state of S; the command "Start" will cause S to go high and the command "End" will cause S to stay low.

At the first portion of the video line, where it is anticipated that the synthesized ramp will be a rising ramp, the undelayed input from the B terminals of latches U9 and U10 is selected. On the falling edge, i.e. at the descending ramp near the end of the video line, the delayed input on the A terminals of U9 and U10 is selected. Thus, at the instant when the breakpoint is applied to the input signal, the breakpoint amplitude is captured at U9 and U10 and held at the outputs thereof so as there is no subsequent transition.

As described above, the output signals on terminals Y0, Y1, . . . , Y8 of latch U9 are applied to the input terminals B0, B1, . . . , B8 of subtractor U11. The A terminals of subtractor U11, i.e. terminals A0, A1, . . . , A8, are hard wired (directly connected) to VCC and to ground thus providing the numerical value representing blanking level to these terminals, i.e. video amplitude level 119. Thus the output signal on terminals S of subtractor U11 is the difference "D" between blanking and the captured video cutpoint value.

The values of one-eighth, one-half, and seven-eighths were chosen for construction of the synthesized ramp because these values may be efficiently calculated in binary logic by bit shifting. Thus, the output signals (Designated "D") of subtractor U11 on terminals S thereof are provided as input signals to adder U12 on the terminals B0, B1, . . . , B5 thereof. The A terminals (A0, A1, . . . , A8) of latch U12 are hard wired to the blanking voltage level VCC and to ground. Thus, the input signals on terminals B0, B1, . . . , B5 of adder U12 are one-eighth of the transition quantity D, i.e. the difference due to the elimination of the three least significant bits (shift left three times) by subtractor U11 from the video difference value. Thus, adder U12 is adding one-eighth of the video transition quantity D to the hardwired blanking input value and providing the sum (Blanking+⅛·D) at the output terminals S [7:0] of adder U12. This is only an eight bit number since bit 8 will be always 0, by definition of the video signal, where the largest value is 168.

The output terminals S [7:0] of subtractor U11 are also connected to the B input terminals of the second adder U16 at terminals B0, B1, ..., B7 of adder U16. As can be seen, adder U16 is an eight bit adder. Adder U12 is a seven bit adder. Adder U16 adds the hardwired blanking input on terminals A0, A1, . . . , A7 thereof to the calculated one-half of the transition amount. The one-half of the transition amount is calculated by a one bit shift, i.e. dividing by two, which is supplied on the B terminals which are the input terminals of U16 i.e. terminals B0, B1, . . . , B7. Thus the output of adder U16 on terminals S of adder U16 is the blanking level plus one-half of the distance between the blanking level and the cutpoint video level (Blanking+½·D). The output terminals S of adder U16 are connected to the C input terminals of multiplexer U43 via latch U8.

The output signals on terminals S of subtractor U15 are provided via latch U46 to the D input terminals of pre-multiplexer U43. Subtractor U15 subtracts one-eighth of the distance D from the total video signal resulting in an output of the blanking level plus seven-eighths of the distance (Blanking+⅞·D), so that Video - ⅛·D=blanking+⅞·D. Thus the video level captured in latch U10 is supplied to the B input terminals (i.e. B0, B1, . . . , B8) of subtractor U15. The A input (on terminals A0, A1, . . . , A5) of subtractor U15 is fed by the output S of subtractor U11 shifted by three bits; the upper bits of the input A (A6 . . . A8) are connected to ground.

The logic circuit shown in the lower left hand portion of FIG. 2 performs the following functions. Counter U17 is a part of a state machine connected to the end, start, and reset input terminals of the ramp generator for determining the start and end points of the ramps. The start command starts the upward (leading edge) ramp calculation; the end command begins the downward (trailing edge) ramp calculation. Thus the start command applied to the start terminal triggers the up/down counter U17 which defines the states of S and E, enabling the calculation of blanking+⅛·D, blanking+½·D and blanking+⅞·D, which are respectively supplied to the B, C, D, inputs of the multiplexer U43. The A input is supplied with the delayed video signal. The QA[0:1] signal from the counter U17 provides the count sequence from the counter U17 to the multiplexer U43 selection input, thus selecting blanking, the three individual ramp values and ending up with the breakpoint video level, as the counter U17 steps through 0, 1, 2, 3 and 0 at the pixel rate.

The other circuitry in the lower left hand portion of FIG. 2 provide insertion of data into the vertical blanking interval in response to the insert command provided on the insert terminal. This inserted data is "scrambling seed" which is conventionally used for scrambling a video signal, and is not directly associated with the above described synthesized video ramp.

Select circuit U13 provides data so that the input from the logic gates connected to input terminals S0, S1 of select circuit U13 forces the output of U13 to be one of the video levels 0, 3, 119, or 351.

The significance of these video levels is that 3 is the sync tip level, 119 is the blanking level, and 351 is the 80% IRE level. Thus, the blanking level 119 represents a logical "0" and the 351 level represents a logical "1". These two signal levels thus represent a binary number which is the scrambling seed and which is inserted into the vertical blanking internal of the video signal by select circuit U13 and multiplexer U14. The scrambling seed itself is provided at input terminal OC2 (lower left hand portion of FIG. 2) and is inserted at a position determined by the insert command provided at the insert terminal (lower left hand portion of FIG. 2). While in this embodiment the video insertion circuitry is shown combined with the ramp generator, in other versions these two functions could be performed by separate circuitry.

FIGS. 3, 4, and 5 show in greater detail the circuitry of various of the blocks of FIG. 2.

The ramp generator and video insertion circuitry disclosed herein is typically used in conjunction with circuitry similar to that disclosed in copending application Serial No. 07/743,049, referenced above, in a professional video application where phase continuity is maintained using a time based corrector or where no time based error accrues such as an all-electronic transmission system. Thus a typical application of the circuitry disclosed herein would be both in the up link and down link of a satellite transmission system for video scrambling and descrambling. FIGS. 6(a) to 6(d) of the present application illustrate the full circuitry of such a video scrambling system in which a ramp generator as described above would be used. This video scrambling system is similar to that disclosed in above-referenced copending application Ser. No. 07/743,049, except that in accordance with the present invention, the ramp generator and insertion circuitry of FIG. 2 of the present application is the block labelled "ACT1010" (circuit U11) shown in the upper right hand portion of FIG. 6(a) of the present application.

The above description is illustrative and not limiting. Further modifications will be apparent to one of ordinary skill in the art in the light of this disclosure and the appended claims.

I claim:

1. A method of providing a transition between a first and a second video levels at a cutpoint in a scrambled video line comprising the steps of:

determining the first video level and the second video level; and synthesizing an S-curve including three intermediate video levels between the first and second video levels.

2. The method of claim 1 further comprising the step of converting the first and second video levels to digital values, before the step of synthesizing.

3. The method of claim 1, wherein the S-curve approximates a sine$^2$ curve.

4. The method of claim 1, wherein the first video level is the blanking level.

5. The method of claim 1, wherein each intermediate video level occurs one clock cycle after the previous intermediate video level.

6. The method of claim 5, wherein for the three intermediate video levels, the first has a value of the blanking level plus ⅛ of the difference between the first and second video levels, the second has a value of the blanking level plus ½ of the difference, and the third has a value of the blanking level plus ⅞ of the difference, thereby synthesizing a sine$^2$ curve.

7. The method of claim 1, further comprising the step of determining a difference between the first and second video levels, and only performing the step of synthesizing if the difference exceeds a predetermined amount.

8. The method of claim 3, wherein the step of calculating comprises shifting bits in the digital values.

9. The method of claim 1, wherein the step of synthesizing comprises the steps of:

providing a multi-stage delay line; and using the delay line to delay each intermediate value by a unique predetermined amount of time.

10. A method of providing a transition at a cutpoint in a scrambled video line for a line rotation scrambling system, comprising the steps of:

digitizing at least part of the video line at the cutpoint;

determining a first digital video level just prior to the cutpoint and a second digitzed video level just subsequent to the cutpoint, the first and second video levels being associated with consecutive clock cycles of the video line;

calculating at least three intermediate digitized video levels characterizing an S-curve between the first and second digitized video levels by shifting bits in the first and second digitized video levels, each intermediate video level being associated with one clock cycle of the video line;

providing a multi-stage delay line; and switching the intermediate video levels through predetermined stages of the delay line, thereby synthesizing a transition between the first and second video levels extending over at least four clock cycles.

11. A system for providing a synthesized ramp transition at a cutpoint in a scrambled video line, comprising:

an analog to digital converter for digitizing video amplitude levels of pixels of the video line at least at the cutpoint;

a ramp generator for synthesizing a ramp at the cutpoint including:

arithmetic logic for digitally calculating at least three intermediate video levels between the two digitized video levels defining the cutpoint;

a delay line having at least three successively connected stages, each stage being associated with a consecutive pixel of the digitized video line; and a multiplexer for selecting amongst the three calculated video levels and providing one of them to each selected stage of the delay line, thereby synthesizing a ramp transition at the cutpoint extending over at least three consecutive pixels.

12. The system of claim 11, wherein the three intermediate video levels define an S-curve.

13. The system of claim 12, wherein the S-curve approximates a $sine^2$ curve.

14. A method of providing transitions at cutpoints in a scrambled video line for a line rotation system, comprising the steps of:

digitizing at least part of the video line at each cutpoint;

determining a first digital video level just prior to a first cutpoint and a second digitized video level just subsequent to the first cutpoint, the first and second video levels being associated with consecutive clock cycles of the video line;

calculating at least three intermediate digitized video levels characterizing an S-curve before the first cutpoint, thus replacing the original video levels leading to the cutpoint with the calculated values, each intermediate video level being associated with one-clock cycle of the video line;

calculating at least three intermediate digitized video levels characterizing an S-curve after a second cutpoint, thus replacing the original video levels after the second cutpoint with the calculated values, each intermediate video level being associated with one clock cycle of the video line;

providing a multi-stage delay line; and switching the intermediate video levels through predetermined stage S of the delay line, thereby synthesizing a transition between the blanking level of video and the first cutpoint and between the second cutpoint and the blanking level, each transition extending at least over four clock cycles.

15. A system for providing synthesized ramp transitions at at least two cutpoints in a scrambled video line, comprising:

an analog to digital converter for digitizing video amplitude levels of pixels of the video line at least at each of the cutpoints;

a ramp generator for synthesizing a ramp at each of the cutpoints including:

arithmetic logic for digitally calculating at least three intermediate video levels between the two digitized video levels defining each cutpoint;

a delay line having at least three successively connected stages, each stage being associated with a consecutive pixel of the digitized video line; and a multiplexer for selecting amongst the three calculated video levels and providing the calculated video levels in sequence to an output port, thereby synthesizing a positive ramp transition before a first cutpoint and a negative ramp transition following a second cutpoint, each transition extending over at least four consecutive pixels.

* * * * *